(12) United States Patent
Teramoto et al.

(10) Patent No.: US 11,633,817 B2
(45) Date of Patent: Apr. 25, 2023

(54) MANUFACTURING SYSTEM

(71) Applicant: HIRATA CORPORATION, Kumamoto (JP)

(72) Inventors: Keisuke Teramoto, Kumamoto (JP); Masaru Kozaki, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 17/474,101

(22) Filed: Sep. 14, 2021

(65) Prior Publication Data
US 2021/0402536 A1 Dec. 30, 2021

Related U.S. Application Data

(63) Continuation of application No. PCT/JP2019/014289, filed on Mar. 29, 2019.

(51) Int. Cl.
*B23P 19/04* (2006.01)
*B23P 19/00* (2006.01)
(Continued)

(52) U.S. Cl.
CPC ............ *B23P 19/04* (2013.01); *B23P 19/007* (2013.01); *B25J 9/0093* (2013.01); *B25J 9/0096* (2013.01);
(Continued)

(58) Field of Classification Search
CPC ............... Y10T 29/37; Y10T 29/49321; Y10T 29/49769; Y10T 29/49771;
(Continued)

(56) References Cited

U.S. PATENT DOCUMENTS 8,006,824 B2 * 8/2011 Wada ............... B65G 61/00
414/277
8,899,933 B2 12/2014 Farineau et al.
(Continued)

FOREIGN PATENT DOCUMENTS

CN 101956574 A 1/2011
CN 204673639 U 9/2015
(Continued)

OTHER PUBLICATIONS

Extended European Search Report dated Jan. 11, 2022, issued in corresponding European Application No. 19922730.7. (7 pages).
(Continued)

*Primary Examiner* — Matthew P Travers
(74) *Attorney, Agent, or Firm* — Buchanan Ingersoll & Rooney PC

(57) ABSTRACT

A manufacturing system manufactures a rotating assembly by attaching a plurality of attached target members in a circumferential direction of a rotating main body portion. A storage member capable of storing the plurality of attached target members is placed on a stand. A measurement device measures a physical amount of the attached target member An attachment device attaches one attached target member to a predetermined position in the circumferential direction of the rotating main body portion based on the physical amount measured by the measurement device A transfer device transfers the attached target member.

10 Claims, 20 Drawing Sheets

(51) Int. Cl.
  *B25J 9/00* (2006.01)
  *B25J 11/00* (2006.01)
  *B25J 9/02* (2006.01)
  *F01D 25/28* (2006.01)
  *B23P 15/00* (2006.01)
  *F01D 5/02* (2006.01)

(52) U.S. Cl.
  CPC .......... *B25J 11/005* (2013.01); *F01D 25/285* (2013.01); *B23P 15/006* (2013.01); *B25J 9/026* (2013.01); *F01D 5/027* (2013.01); *F05D 2230/68* (2013.01)

(58) Field of Classification Search
  CPC .......... F01D 5/303–3038; F01D 5/027; F01D 25/285; B23P 15/006; B23P 19/04; B23P 19/042; B23P 19/001; B23P 19/007; B25J 9/0093; B25J 9/0096; B25J 9/026; B25J 11/005; F05D 2230/60; F05D 2230/68; B65G 2205/00
  See application file for complete search history.

(56) References Cited

U.S. PATENT DOCUMENTS

| | | | |
|---|---|---|---|
| 9,163,513 B2 | 10/2015 | Bestwick | |
| 2008/0075592 A1* | 3/2008 | Lee | F01D 5/027 416/1 |
| 2011/0008171 A1 | 1/2011 | Tsumura et al. | |
| 2019/0176340 A1* | 6/2019 | Sei | F16H 41/28 |
| 2020/0201295 A1 | 6/2020 | Ottnad et al. | |

FOREIGN PATENT DOCUMENTS

| | | | |
|---|---|---|---|
| CN | 106782014 A | 5/2017 | |
| CN | 108689161 A | 10/2018 | |
| DE | 102017215608 A1 | 3/2019 | |
| EP | 3023590 A1 | 5/2016 | |
| JP | S60-025670 A | 2/1985 | |
| JP | H0112614 B2 | 3/1989 | |
| JP | H0545245 A | 2/1993 | |
| JP | H07137834 A | 5/1995 | |
| JP | 2000024849 A | 1/2000 | |
| JP | 2010159700 A | 7/2010 | |
| JP | 2010270751 A | 12/2010 | |
| JP | 2013139769 A | 7/2013 | |
| JP | 5999845 B2 | 9/2016 | |

OTHER PUBLICATIONS

International Search Report (PCT/ISA/210) with translation and Written Opinion (PCT/ISA/237) dated May 21, 2019, by the Japan Patent Office as the International Searching Authority for International Application No. PCT/JP2019/014289. (9 pages).

Chinese Office Action issued in CN application No. 201980094699.3; dated Feb. 10, 2023. 12 Pages (with Translation).

* cited by examiner

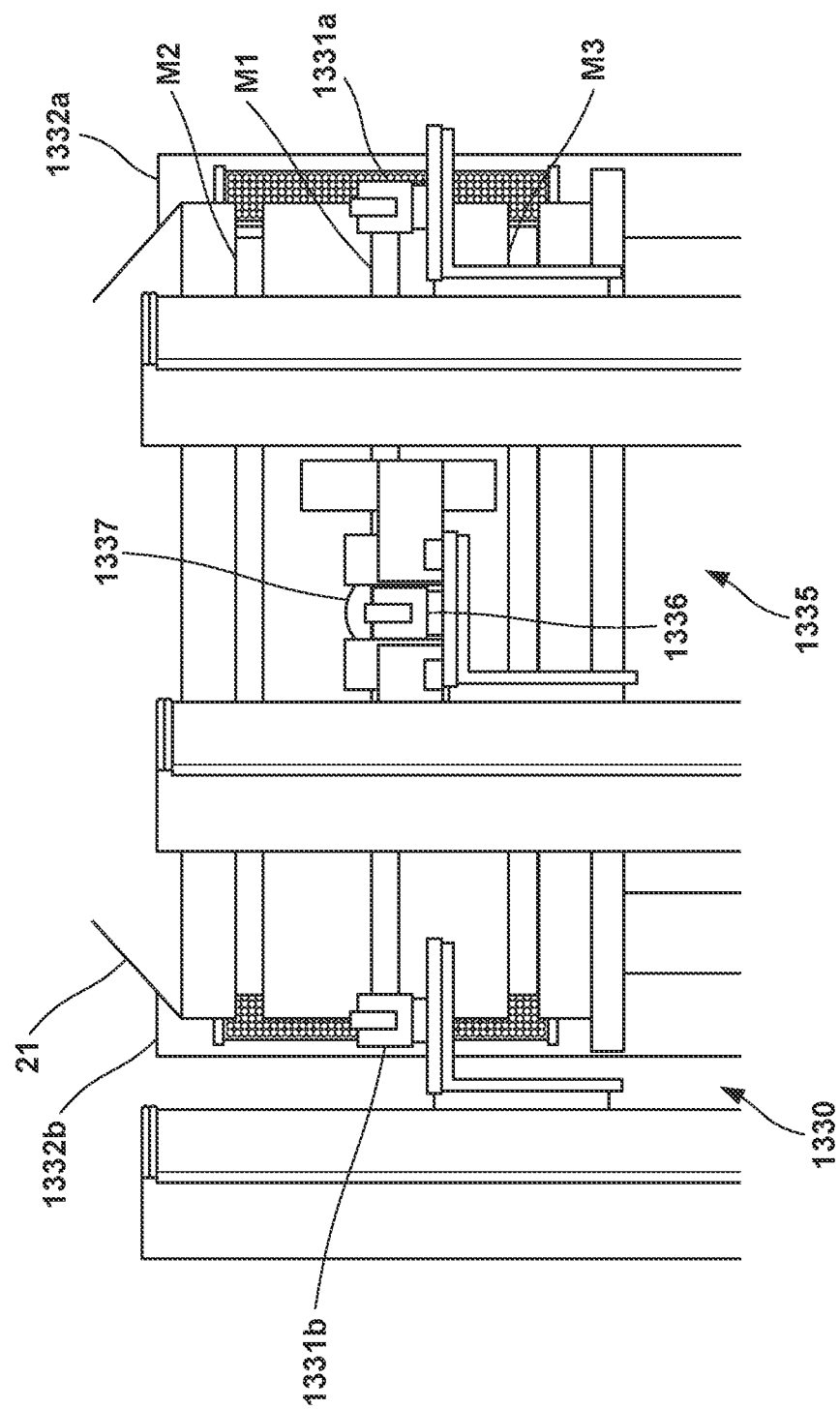

F I G. 13A
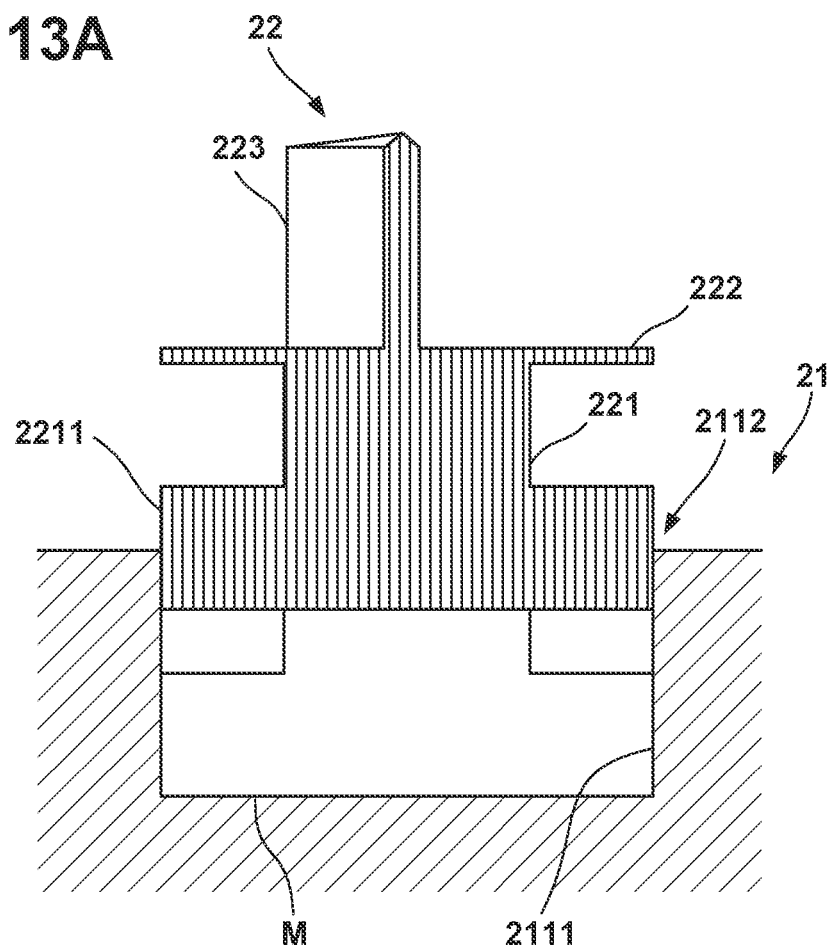
F I G. 13B
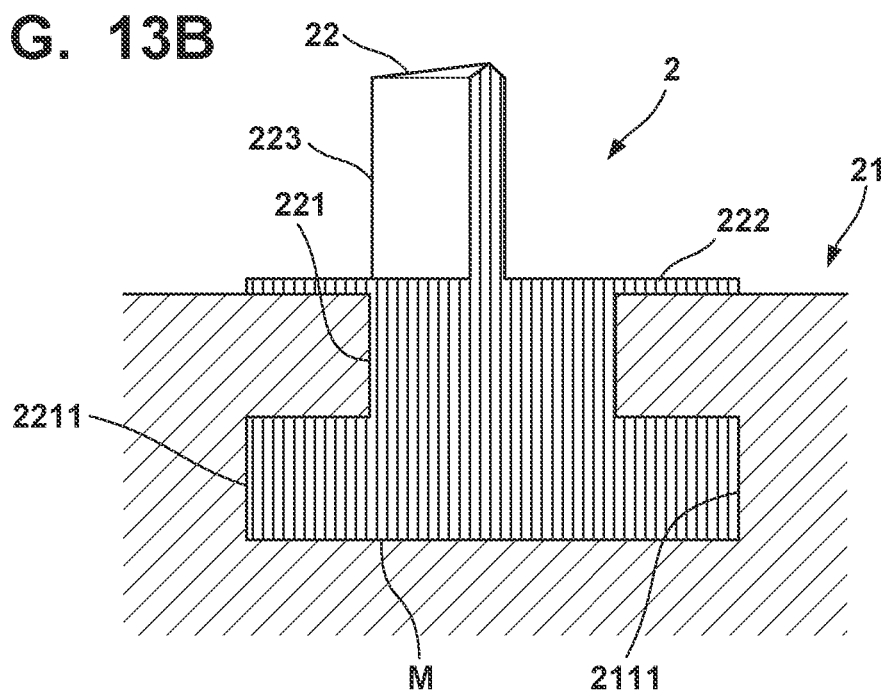

MANUFACTURING SYSTEM

CROSS-REFERENCE TO RELATED APPLICATION(S)

This application is a continuation of International Patent Application No. PCT/JP2019/014289 filed on Mar. 29, 2019, the entire disclosures of which are incorporated herein by reference.

BACKGROUND OF THE INVENTION

Field of the Invention

The present invention relates to a manufacturing system of a rotating assembly.

Description of the Related Art

As a rotating assembly manufactured by attaching a plurality of parts around a rotating body, there exists a turbine generator used in an aircraft engine or for power generation. As a method of attaching blades as attached target members to a rotating body, a method of attaching a plurality of blades to grooves formed in the circumferential direction of a rotating body has been disclosed (Japanese Patent Laid-Open No. 2010-270751 and Japanese Patent Laid-Open No. 2013-139769). There is also disclosed a method of attaching blades to a plurality of attachment portions formed at a predetermined interval around a rotating body (Japanese Patent No. 5999845).

SUMMARY OF THE INVENTION

According to an embodiment of the present invention, there is provided a manufacturing system configured to manufacture a rotating assembly by attaching a plurality of attached target members in a circumferential direction of a rotating main body portion, comprising: a stand on which a storage member capable of storing the plurality of attached target members is placed; a measurement device configured to measure a physical amount of the attached target member; an attachment device configured to attach one attached target member to a predetermined position in the circumferential direction of the rotating main body portion based on the physical amount measured by the measurement device; and a transfer device configured to transfer the attached target member.

Further features of the present invention will become apparent from the following description of exemplary embodiments (with reference to the attached drawings).

BRIEF DESCRIPTION OF THE DRAWINGS

FIG. 10 is a view taken in the direction of an arrow 8A in FIG. 8;

FIG. 13A is a sectional view taken along a line I-I in FIG. 11, which is a schematic view showing a state halfway through inserting the blade into the attachment portion;

FIG. 13B is a sectional view taken along a line II-II in FIG. 11, which is a view showing a state in which the blade engages with the attachment portion;

DESCRIPTION OF THE EMBODIMENTS

Figure 1:
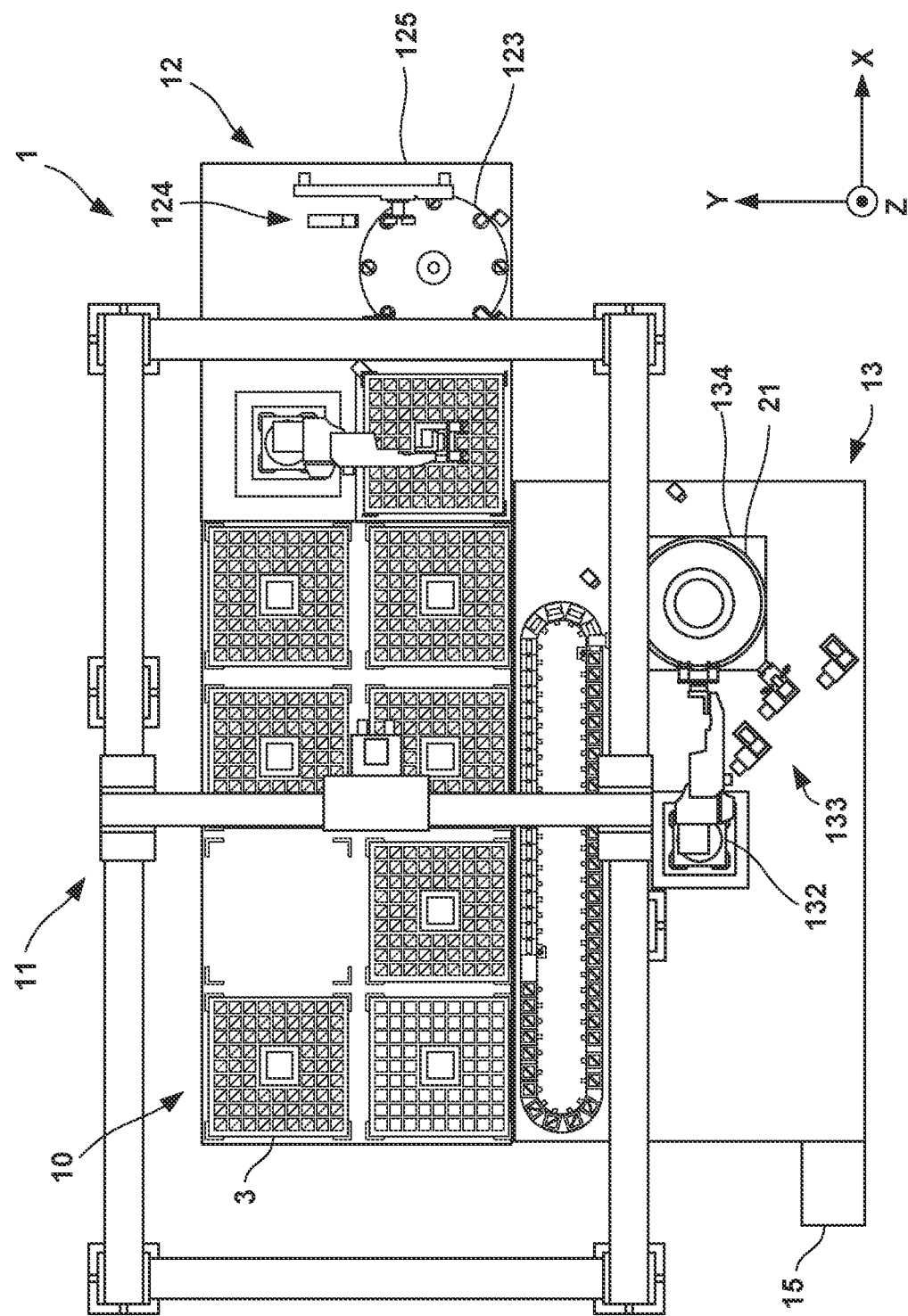
FIG. 1 is a plan view schematically showing a manufacturing system according to an embodiment.

In the conventional technique, some of works for attaching the plurality of blades to the rotating body are performed by a worker, and there is room of improvement in the viewpoint of work efficiency.

An embodiment of the present invention has been made in consideration of the above-described problem, and provides a technique of efficiently manufacturing a rotating assembly.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Note that in the drawings, the X direction and the Y direction are defined as horizontal directions, and the Z direction is defined as a vertical direction.

<Manufacturing System>

FIG. 1 is a plan view schematically showing a manufacturing system 1 according to an embodiment of the present invention. The manufacturing system 1 is a system configured to manufacture a rotating assembly by attaching a plurality of attached target members to a rotating main body portion 21. In this embodiment, a blade 22 (see FIG. 2) serving as the attached target member is attached to the rotating main body portion 21. A rotating assembly 2 (see FIG. 13B) manufactured by the manufacturing system 1 can be used as a constituent component of an aircraft engine or a turbine generator. In this embodiment, the manufacturing system 1 includes a stand 10 on which a tray 3 storing a blade 22 is placed, a transfer device 11 configured to transfer the blade 22, a measurement device 12 configured to measure the physical amounts of the blade 22, and an attachment device 13 configured to attach the blade 22 to the rotating main body portion 21. The manufacturing system 1 also includes a control device 15 configured to generally control these devices. Note that the configuration of each device will be described later.

<Blade and Tray>

Figure 2:
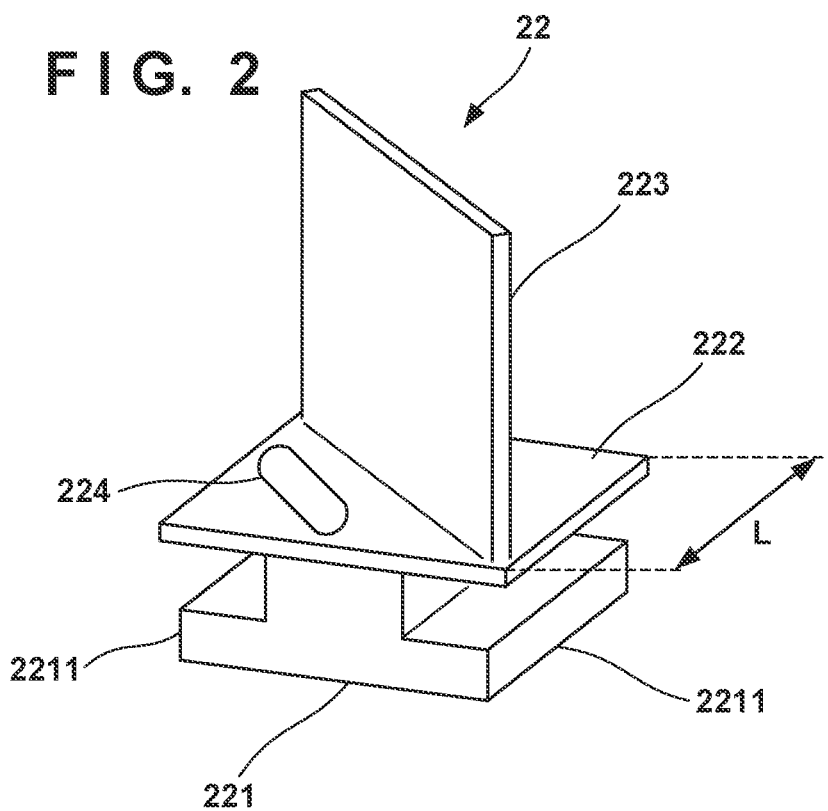
FIG. 2 is a perspective view schematically showing the configuration of a blade according to the embodiment.

FIG. 2 is a perspective view schematically showing the configuration of the blade 22. The blade 22 is an attached target member to be attached to the rotating main body portion 21 in the manufacturing system 1. For example, the blade 22 is made of a heat resistant alloy (for example, a nickel-base superalloy or a titanium-aluminum alloy), a ceramic matrix composite material (CMC), or the like. In this embodiment, the blade 22 includes a root portion 221, a flange portion 222, a wing-shaped portion 223, and an identifier 224.

The root portion 221 is configured to be engageable with a groove 211 of the rotating main body portion 21. When an engaged portion 2211 on the lower side of the root portion 221 engages with an engaging groove 2111 of the groove 211 shown in FIGS. 13A and 13B, the movement of the blade 22 with respect to the rotating main body portion 21 in the radial direction (the up-and-down direction in FIG. 13B) and the rotation axis direction (the left-and-right direction in FIG. 13B) is regulated. The wing portion 223 forms a so-called rotor blade of the rotating assembly 2. The flange portion 222 defines the interval between the wing portions 223. If a plurality of blades 22 are arranged in the circumferential direction of the rotating main body portion 21, the flange portions 222 of the adjacent blades 22 abut against each other, thereby keeping the interval between the wing portions 223 in a predetermined value. The identifier 224 is used to identify each blade 22. As the identifier 224, for example, a two-dimensional code such as a barcode or a QR Code® may be used.

Figure 3:
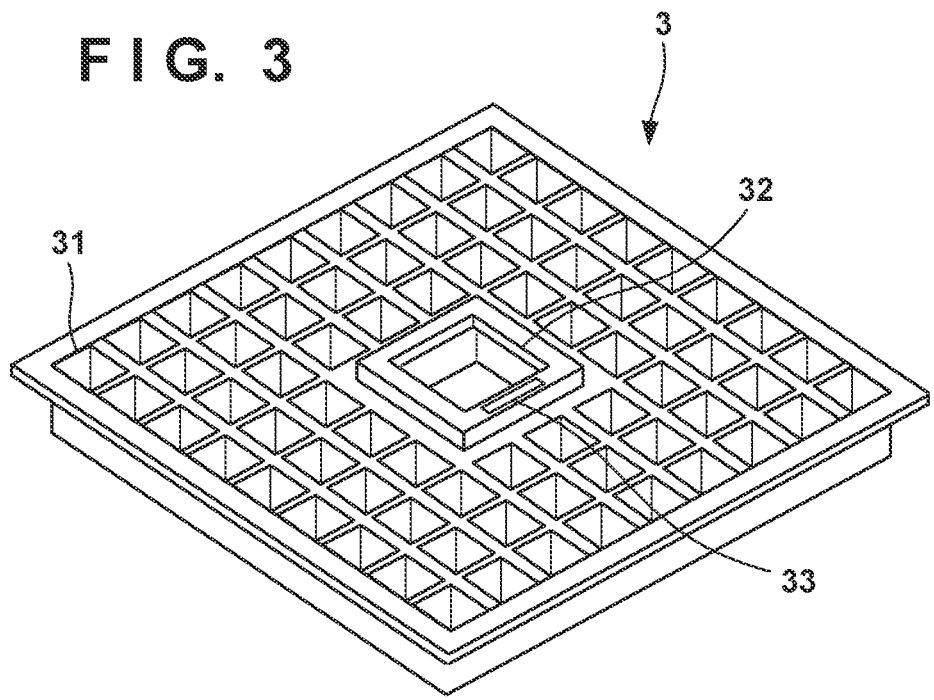
FIG. 3 is a perspective view schematically showing the configuration of a tray according to the embodiment.

FIG. 3 is a perspective view schematically showing the configuration of the tray 3. The tray 3 is a storage member capable of storing the blade 22 as an attached target member. The tray 3 includes a plurality of blade storage portions 31, a held portion 32, and an identifier 33.

Each of the plurality of blade storage portions 31 can store the blade 22. The plurality of blade storage portions 31 are configured to be able to store the blades 22 that are arranged one by one in one direction or in a direction crossing the one direction. The held portion 32 is a portion to be held by a tray holding portion 111 of the transfer device 11 when the transfer device 11 transfers the tray 3. The identifier 33 is used to identify each tray 3. As the identifier 33, the same identifier as the identifier 224 can be used. The identifier 33 can be read by a reading portion 115 (to be described later) of the transfer device 11, and is stored in a tray storage information storage portion 1262a (to be described later) in association with the identifier 33 of the tray 3, the position of the blade storage portion 31, and the identifier 224 of the blade 22. Note that as for the blade storage portions 31, the reference numeral is added to only some of these and omitted for the remaining in consideration of the visibility.

<Stand>

Figure 4:
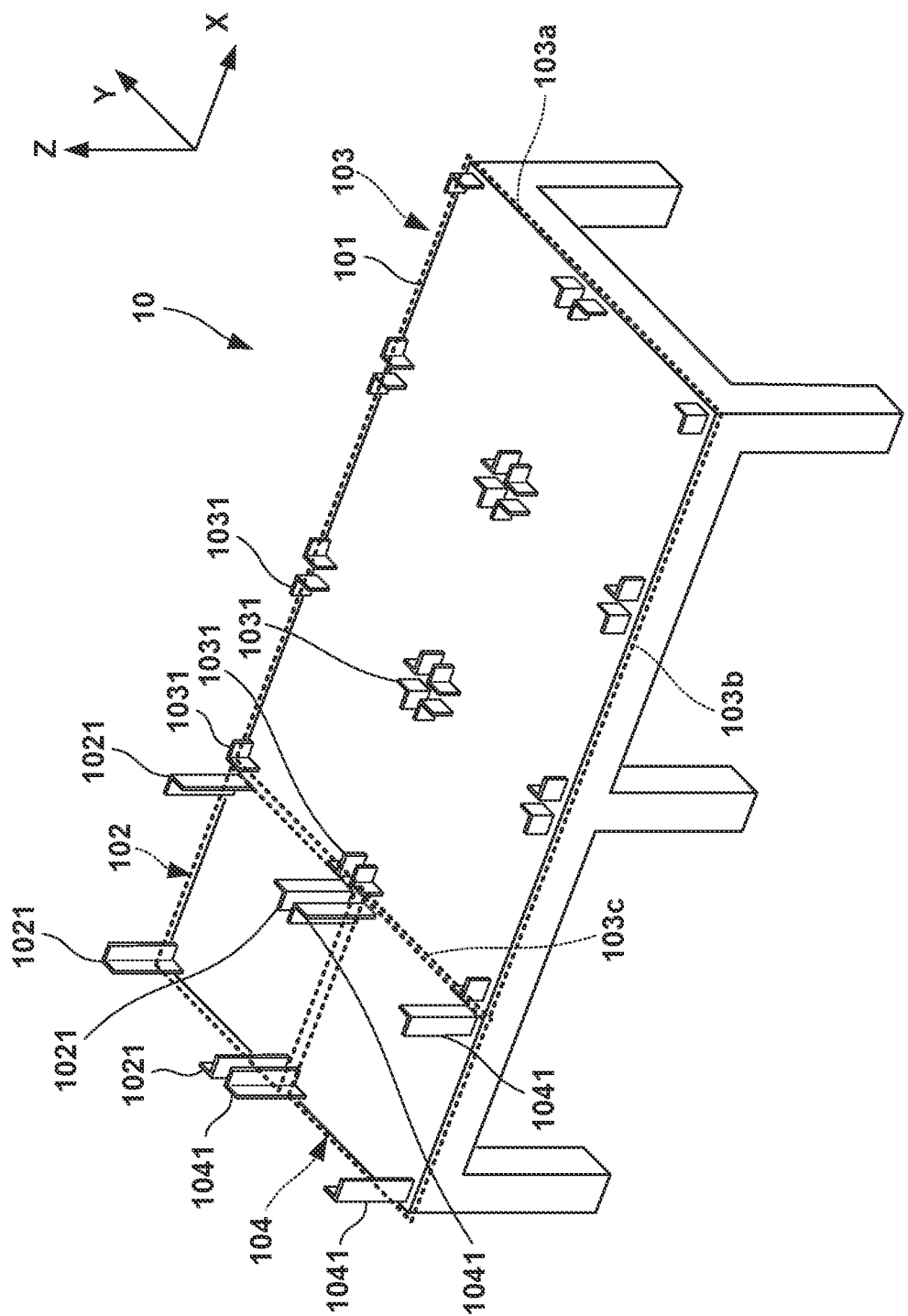
FIG. 4 is a perspective view showing the outline of a stand shown in FIG. 1.

FIG. 4 is a perspective view showing the outline of the stand 10 shown in FIG. 1. The stand 10 is a table used to temporarily place the tray 3. In this embodiment, the stand 10 includes a placement member 101 configured to place the tray 3, and the placement region of the placement member 101 is divided into a supply region 102, a standby region 103, and a collection portion 104.

The supply region 102 is a region on which the tray 3 transferred from the outside of the manufacturing system 1 is placed. That is, in this embodiment, the supply region 102 is a region to which the tray 3 in a state in which the blades 22 are stored is supplied. The supply region 102 is provided with positioning members 1021 configured to position the tray 3. The positioning member 1021 extends upward from the placement member 101 up to a position much higher than the height of one tray 3. This makes it possible to stack a plurality of trays 3 in the supply region 102. Note that the tray 3 supplied to the supply region 102 may be in an empty state without the blades 22 stored.

The standby region 103 is a region used to make the tray 3 storing the blades 22 measured by the measurement device 12 stand by. To place a plurality of trays 3 arranged in the horizontal direction without stacking them, the standby region 103 has a space larger than the supply region 102 or the collection portion 104. In this embodiment, the standby region 103 is provided in a rectangular shape to place a plurality of trays arranged in the X direction and the Y direction. Hence, as for the trays 3 placed in the standby region 103, the identifier 33 of the tray 3 or the identifier 224 of the blade 22 can be read by the reading portion 115 (to be described later) of the transfer device 11 located above these. Note that as the tray 3 to be made to stand by in the standby region 103, the empty tray 3 in which the blades 22 are not stored in the plurality of blade storage portions 31 may be placed.

Also, the standby region 103 is provided with positioning members 1031 configured to position the tray 3. Note that the tray 3 storing the blades 22 before measurement may be placed in the standby region 103. Note that as for the positioning members 1031, the reference numeral is added to only some of these and omitted for the remaining in consideration of the visibility.

The collection portion 104 is a region on which the tray 3 to be transferred to the outside of the manufacturing system 1 is placed. That is, the tray 3 that waits for collection is placed in the collection portion 104. The tray 3 that has been emptied by transferring the stored blades 22 to the attachment device 13 is transferred to the collection portion 104 by the transfer device 11. Note that the tray 3 placed in the collection portion 104 may be in a state in which the blades 22 are stored in it. The collection portion 104 is provided with positioning members 1041 configured to position the tray 3. The positioning member 1041 extends upward from the placement member 101 up to a position much higher than the height of one tray 3. This makes it possible to stack a plurality of trays 3 in the supply region 102. In addition, when the supply region 102 and the collection portion 104 are provided, the tray 3 can be sequentially supplied and collected, and the manufacturing system 1 can be continuously operated.

A description will be made with reference to FIG. 1 as well. In this embodiment, the measurement device 12 is provided on a first side 103a (the right side in FIG. 1) of the stand 10, and the attachment device 13 is provided on a second side 103b (the lower side in FIG. 1) different from the first side 103a. Also, a portion on a third side 103c (the left side in FIG. 1) different from the first side 103a and the second side 103b of the stand 10 is used as the supply region 102 and the collection portion 104. As described above, the measurement device 12 and the attachment device 13 are provided adjacent to the standby region 103 of the stand 10. Transfer of the tray 3 or the blades 22 is performed by the transfer device 11 across and above the supply region 102, the collection portion 104, the measurement device 12, and the attachment device 13. Hence, the moving distance of the tray 3 and the blades 22 is reduced, and the manufacturing system 1 can efficiently perform manufacture.

<Transfer Device>

Figure 5:
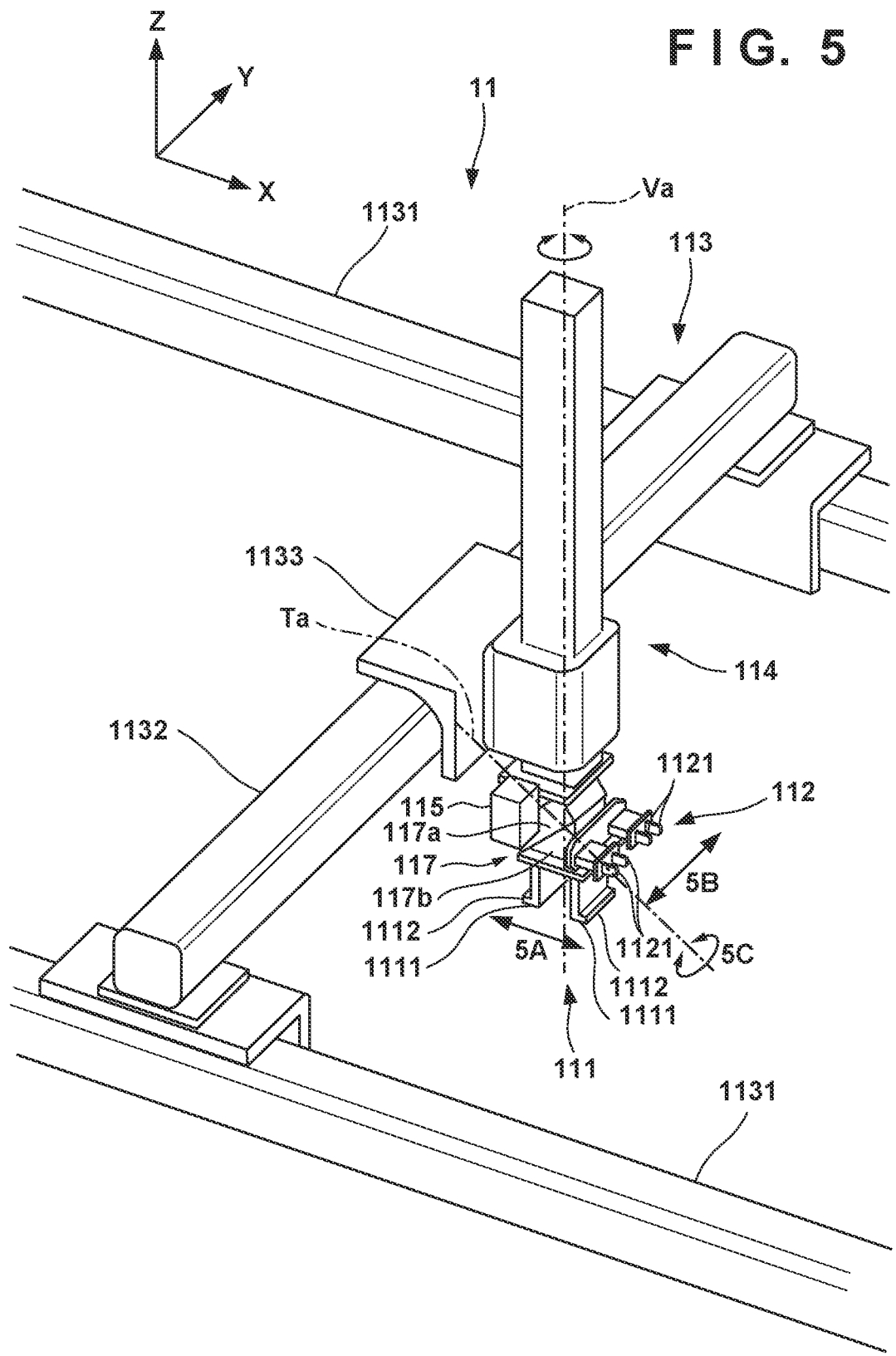
FIG. 5 is a perspective view showing the outline of a transfer device shown in FIG. 1.

FIG. 5 is a perspective view showing the outline of the transfer device 11 shown in FIG. 1. The transfer device 11 is a device configured to transfer the blade 22 between the stand 10 and the measurement device 12 and between the stand 10 and the attachment device 13. In this embodiment, the transfer device 11 is a so-called gantry-type orthogonal robot, and is provided to be movable in the horizontal direction and the vertical direction above the stand 10, the measurement device 12, and the attachment device 13. Also, in this embodiment, the transfer device 11 includes a tray holding portion 111, a blade holding portion 112, a horizontal moving portion 113, a vertical moving portion 114, the reading portion 115, a support portion 117, and a control portion 116 (to be described later). Note that as the configuration of the transfer device 11, for example, another known device such as a vertical articulated robot can also be employed.

The tray holding portion 111 holds the tray 3. In this embodiment, the tray holding portion 111 includes a pair of plate-shaped members 1111, 1111 each including a hook portion 1112. When the plate-shaped members 1111, 1111 are translated in directions (the direction of an arrow 5A) in which these separate from each other, the hook portions 1112, 1112 are hooked on hooked portions (not shown) of the held portion 32 of the tray 3, and the tray 3 is held. Note that the configuration in which the tray holding portion 111 holds the tray 3 is merely an example, and another configuration such as a configuration in which the tray holding portion 111 grips a part of the tray 3 can also be employed.

The blade holding portion 112 (transfer holding unit) holds the blade 22. In this embodiment, two blade holding portions 112, 112 are provided, and each of the blade holding portions 112, 112 includes a pair of grip members 1121, 1121 capable of gripping the wing-shaped portion 223 of the blade 22. The blade holding portion 112 translates the pair of grip members 1121, 1121, 1121 in directions (the direction of an arrow 5B) in which these separate from each other, thereby gripping the wing-shaped portion 223 and thus holding the blade 22. In this embodiment, each of the two blade holding portions 112, 112 can hold one blade 22.

Note that in this embodiment, the tray holding portion 111 and the blade holding portions 112 are supported by the support portion 117 provided at the distal end (lower end) portion of the vertical moving portion 114. The support portion 117 includes a fixed portion 117a attached to the distal end (lower end) portion of the vertical moving portion 114, and a pivotal portion 117b configured to pivot with respect to the fixed portion 117a. In this embodiment, one side of the fixed portion 117a is fixed to the distal end (lower end) portion of the vertical moving portion 114, and the pivotal portion 117b is configured to pivot on the other side. The pivotal axis of the pivotal portion 117b is a tilting axis Ta tilting downward by 45° with respect to a vertical axis Va of the vertical moving portion 114, and the pivotal portion 117b pivots about the tilting axis Ta. The pivotal portion 117b is pivotally supported by the fixed portion 117a. The tray holding portion 111 is formed in one portion tilting by 45° in one direction (horizontal direction) with respect to the tilting axis Ta, and the blade holding portions 112 are formed in the other portion tilting by 45° in the other direction (vertical direction) with respect to the tilting axis Ta. Hence, although the pair of grip members 1121, 1121 are directed in the horizontal direction in FIG. 5, when the pivotal portion 117b of the support portion 117 pivots in the direction (arrow 5C) about the tilting axis Ta, the positions of the tray holding portion 111 and the blade holding portions 112 are replaced, and grip of the blade 22 or the tray 3 on the lower side in the vertical direction of the vertical moving portion 114 can arbitrarily be gripped in accordance with the transfer purpose and transferred. Additionally, in this embodiment, the transfer device 11 includes the two blade holding portions 112. This allows the transfer device 11 to efficiently perform the replacing operation of the blade 22.

The horizontal moving portion 113 is configured to move the tray holding portion 111 and the blade holding portions 112 in the horizontal direction (the X direction and the Y direction in FIG. 5). The horizontal moving portion 113 includes a pair of rail members 1131, 1131 extending in the X direction, an X moving body 1132 that is provided over the pair of rail members 1131, 1131 and is movable in the X direction, and a Y moving body 1133 that is movable in the Y direction on the X moving body 1132.

The pair of rail members 1131, 1131 are provided at an interval in the Y direction, supports the X moving body 1132, and defines the moving range of the tray holding portion 111 and the blade holding portions 112. In this embodiment, the pair of rail members 1131, 1131 extend over the whole area of the stand 10 and a partial area of the measurement device 12 in the X direction and are provided apart from each other such that the whole area of the stand 10 and a partial area of the attachment device 13 are located between these in the Y direction. Accordingly, the tray holding portion 111 and the blade holding portions 112 are configured to be movable over the whole area of the stand 10, a partial area of the measurement device 12, and a partial area of the attachment device 13.

The X moving body 1132 is configured to move the tray holding portion 111 and the blade holding portions 112 in the X direction. For example, the X moving body 1132 includes a driving source (not shown) such as an electric motor. The X moving body 1132 moves the tray holding portion 111 and the blade holding portions 112 in the X direction by causing a pinion mechanism connected to the output shaft of the electric motor to mesh with a rack mechanism provided on each rail member 1131.

The Y moving body 1133 is configured to move the tray holding portion 111 and the blade holding portions 112 in the Y direction. For example, the Y moving body 1133 includes a driving source (not shown) such as an electric motor. The Y moving body 1133 moves the tray holding portion 111 and the blade holding portions 112 in the Y direction by causing a pinion mechanism connected to the output shaft of the electric motor to mesh with a rack mechanism provided on the X moving body 1132. Note that the configurations of the X moving body 1132 and the Y moving body 1133 are not limited to the above-described configurations, and a known configuration can be employed.

The vertical moving portion 114 is configured to move the tray holding portion 111 and the blade holding portions 112 in the vertical direction (Z direction). For example, the vertical moving portion 114 includes a driving source (not shown) such as an electric motor, and moves the tray holding portion 111 and the blade holding portions 112 in the Z direction by a ball screw mechanism or a rack-and-pinion mechanism. Note that the configuration of the vertical moving portion 114 is not limited to the above-described configuration, and a known configuration can be employed.

The reading portion 115 reads the identifier 33 of the tray 3 or the identifier 224 of the blade 22. This can discriminate the tray 3 or the blade 22 that is a transfer target.

Note that in this embodiment, the upper area of the stand 10, the upper area of a part of the measurement device 12, and the upper area of a part of the attachment device 13 form the moving range of the tray holding portion 111 and the blade holding portions 112 of the transfer device 11. However, the moving range can appropriately be designed. For example, the whole areas of the stand 10, the measurement device 12, and the attachment device 13 may form the moving range of the tray holding portion 111 and the blade holding portions 112 of the transfer device 11.

Also, in this embodiment, as will be described later, the transfer device 11 transfers the blade 22 via the tray 3 between the stand 10 and the measurement device 12, and transfers the blade 22 directly between the stand 10 and the attachment device 13. However, a configuration for causing the transfer device 11 to directly transfer the blade 22 between the stand 10 and the measurement device 12 or a configuration for causing the transfer device 11 to transfer the blade 22 via the tray 3 between the stand 10 and the attachment device 13 can also be employed.

<Measurement Device>

Figure 6:
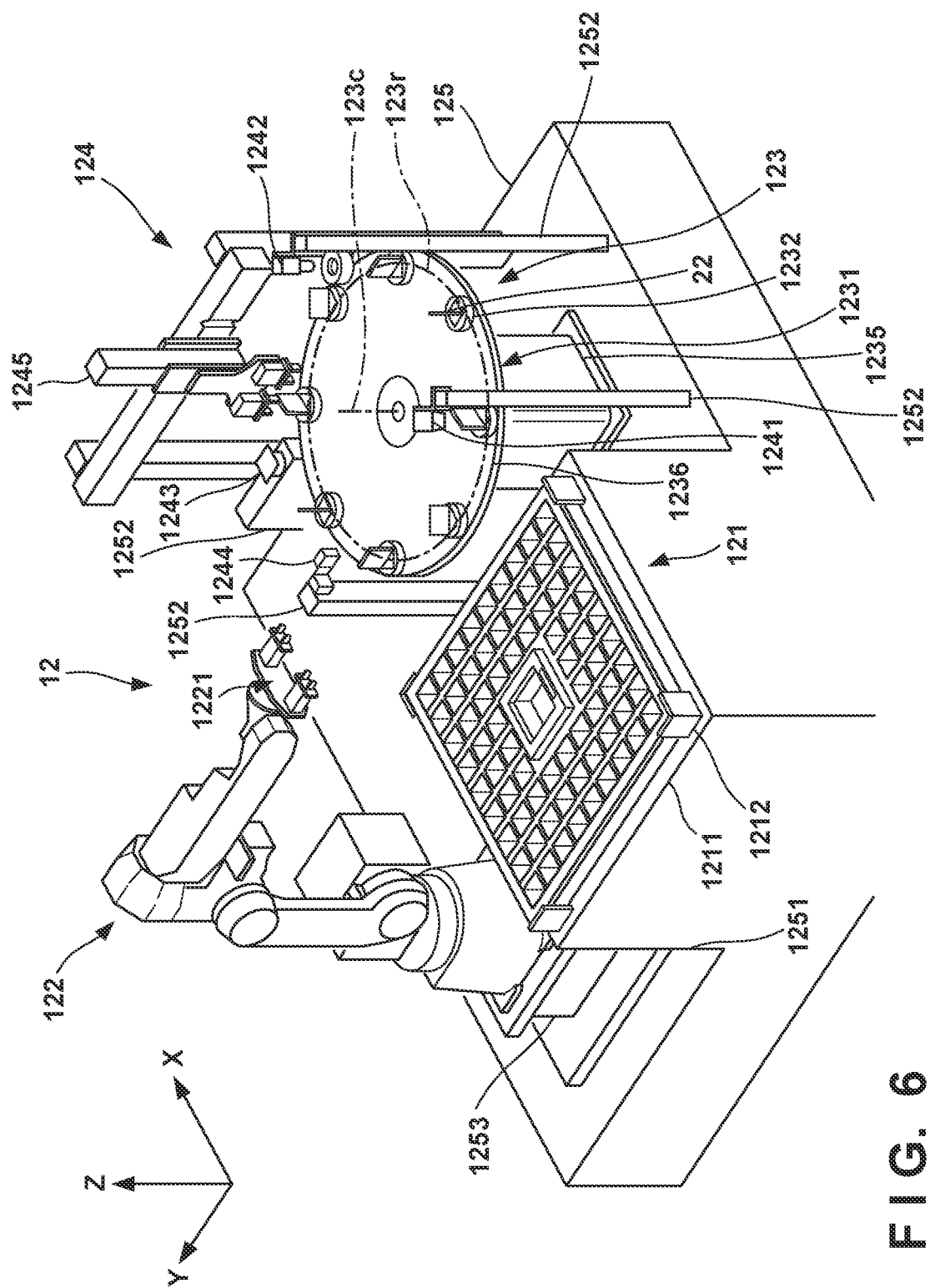
FIG. 6 is a perspective view showing the outline of a measurement device shown in FIG. 1.
Figure 7:
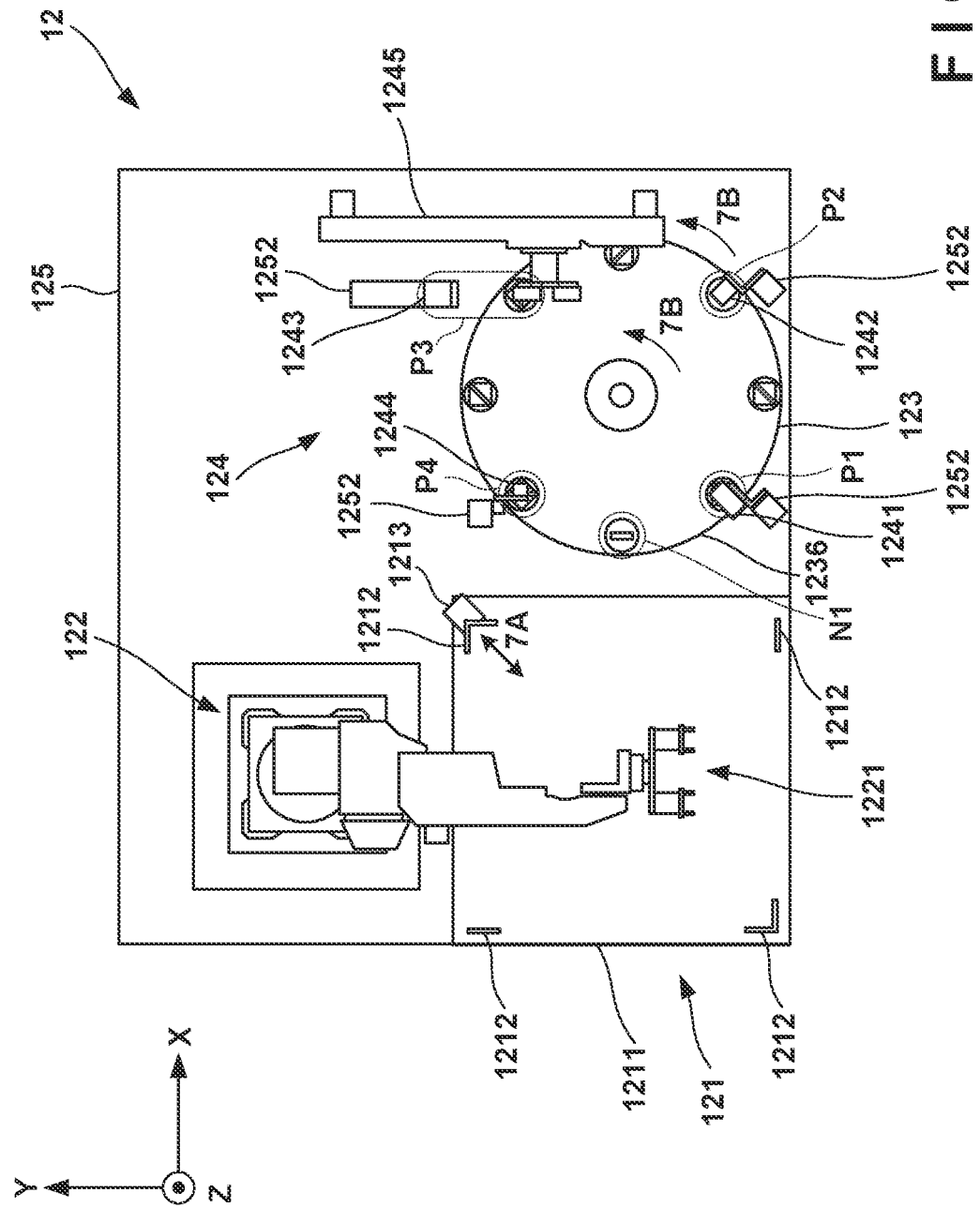
FIG. 7 is a plan view showing the outline of the measurement device shown in FIG. 1.

FIG. 6 is a perspective view showing the outline of the measurement device 12 shown in FIG. 1, and FIG. 7 is a plan view showing the outline of the measurement device 12. The measurement device 12 is a device configured to measure the physical amounts of the blade 22. In this embodiment, the measurement device 12 is provided next to the standby region 103 of the stand 10. Also, in this embodiment, the measurement device 12 includes a placement portion 121, a robot 122, a turn table 123, a measurement unit 124, a base portion 125 that supports these, and a control portion 126 (to be described later).

The placement portion 121 is provided to make the blades 22 stand by before and after measurement, and includes a placement table 1211 on which the tray 3 storing the blades 22 before and after measurement is placed, and a positioning mechanism 1212 configured to position the tray 3. In this embodiment, the placement table 1211 is provided in the measurement device 12 to face the stand 10. This shortens the distance between the placement portion 121 and the stand 10 and enables efficient transfer of the tray 3.

The positioning mechanism 1212 includes regulation members configured to regulate the positions of the four corners of the tray 3, and a displacement unit 1213 capable of displacing one of the regulation members. When the displacement unit 1213 displaces in the direction of an arrow 7A in FIG. 7 in a state in which the tray 3 is placed on the placement table 1211, the tray 3 abuts against each regulation member, and the position of the tray 3 on the placement table 1211 is decided.

The robot 122 transfers the blade 22 between the placement portion 121 and the turn table 123. In this embodiment, the robot 122 is a vertical articulated robot, and its distal end portion is provided with a holding portion 1221 capable of gripping the blade 22. This allows the robot 122 to replace the blade 22 supported by a blade support member 1232 (to be described later) at a replacement position N1 on the turn table 123 with a different blade 22. Note that although the robot 122 is a vertical articulated robot in this embodiment, a horizontal articulated robot or another known industrial robot can be used.

The turn table 123 is provided to place each blade 22 transferred from the placement portion 121 by the robot 123 and move the blade 22 to the measurement unit 124 arranged on the periphery of the turn table 123. When the blade 22 placed on the turn table 123 is moved to each measuring instrument of the measurement unit 124 by the rotary movement of the turn table 123, measurement by the measuring instrument is sequentially performed. The turn table 123 includes a rotatably supported circular plate-shaped member 1231, and a plurality of blade support portions 1232 arranged at a predetermined interval on a concentric circle 123$r$ with respect to an axis 123$c$ serving as the center of the plate-shaped member 1231.

The plate-shaped member 1231 can be rotated in the direction of an arrow 7B in FIG. 7 by, for example, a driving mechanism 1235 such as a motor about the axis serving as the center of the plate-shaped member 1231. When the plate-shaped member 1231 is intermittently operated, each blade support portion 1232 can be moved and stopped at a measurement position of the measurement unit 124. The blade support member 1232 is a support member configured to support the blade 22, and a plurality of blade support members 1232 are provided such that each can support one blade 22. In this embodiment, eight blade support members 1232 are arranged at equal intervals on a peripheral edge portion 1236 of the plate-shaped member 1231. However, the number of the blade support members can appropriately be designed. Note that as for the blade support members 1232, the reference numeral is added to only some of these and omitted for the remaining in consideration of the visibility.

The measurement unit 124 is configured to measure various kinds of physical amounts of the blade 22. The measurement unit 124 includes a reading device 1241, a size measuring instrument 1242, a weight measuring instrument 1243, and a temperature measuring instrument 1244, and these measuring instruments are arranged to execute measurement of the blade 22 supported on the turn table 123. Note that these will be sometimes generically referred to as a measuring instrument 124$a$ hereinafter. Also, the measurement unit 124 includes a transfer mechanism 1245 configured to transfer the blade between the weight measuring instrument 1243 and the turn table 123.

The reading device 1241 reads the identifier 224 (for example, a two-dimensional code such as a barcode or a QR code) added to the blade 22 in advance. This makes it possible to individually manage various kinds of physical amounts measured in each blade 22. For example, the reading device 1241 is a barcode reader.

The size measuring instrument 1242 measures a size measurement portion having a preset size L (the size L in FIG. 2) of the blade 22. The size L corresponds to the size in the circumferential direction when the blade 22 is attached to the rotating main body portion 21. The blade 22 to be attached to the rotating main body portion 21 is selected based on the size L. For example, the size measuring instrument 1242 may include a camera. The size measuring instrument 1242 may capture the blade 22 from above by the camera and calculate the size by analyzing the image data. Also, for example, the size measuring instrument 1242 may be a laser length measuring sensor.

The weight measuring instrument 1243 measures the weight of the blade 22. From the viewpoint of increasing efficiency (improving a gas flow and improving combustion efficiency) and suppressing vibrations in a turbine or the like, the position deviation between the center of gravity of the rotating assembly 2 and its rotation axis when the blade 22 is attached to the rotating main body portion 21 is preferably suppressed. Hence, the blade 22 needs to be arranged in the circumferential direction of the rotating main body portion 21 in balance based on the weight measured by the weight measuring instrument 1243.

The transfer mechanism 1245 includes a grip portion 1245a configured to grip the blade 22, and the blade can be transferred by the grip portion 1245a between the weight measuring instrument 1243 and the turn table 123. Also, the grip portion 1245a can be moved in the Y direction and the Z direction by a driving source (not shown).

The temperature measuring instrument 1244 measures the temperature of the blade 22. This makes it possible to correct the value of the size L in consideration of thermal expansion of the blade 22. For example, the temperature measuring instrument 1244 may be a noncontact infrared radiation thermometer.

In this embodiment, as shown in FIG. 7, measurement regions P2 to P4 and a reading region P1 of the measuring instruments 124a are located at equal intervals on the moving path of the blade support members 1232. That is, the measurement regions P2 to P4 and the reading region P1 are located at equal intervals along the edge of the plate-shaped member 1231 of the turn table 123. Hence, each blade 22 undergoes measurement every time the plate-shaped member 1231 rotates by 90°.

Also, in this embodiment, the eight blade support members 1232 are arranged at equal intervals along the edge of the plate-shaped member 1231, as described above. If four blade support members 1232 which are alternately arranged in the eight blade support members 1232 are located at the measurement positions M1 to M4, one of the remaining four blade support members 1232 arranged between these is located at the replacement position N1. This allows the robot 122 to replace the (already measured) blade 22 after measurement with the (unmeasured) blade 22 before measurement during measurement by each measuring instrument. Hence, the measurement device 12 can efficiently perform measurement and replacement of the blades 22 by rotating/stopping the plate-shaped member 1231 every 45°.

The base portion 125 is provided to be able to support the constituent elements of the measurement device 12. The base portion 125 includes a placement support portion 1251 configured to support the placement portion 121, a measurement support portion 1252 configured to support the measurement unit 124, and a transfer support portion 1253 configured to support the robot 122 that supports the blade 22. Since the relative positions of the placement portion 121, the measurement unit 124, and the robot 122 are thus defined, a work can correctly be performed. In addition, when the heights of the support portions are arbitrarily set to set the height of the tray 3 placed on the placement portion 121, the height of the blade support members 1232 provided on the turn table 123, and a height optimum for transfer of the blade 22 by the robot 122, the transfer efficiency of the blade 22 can be improved.

<Attachment Device>

Figure 8:
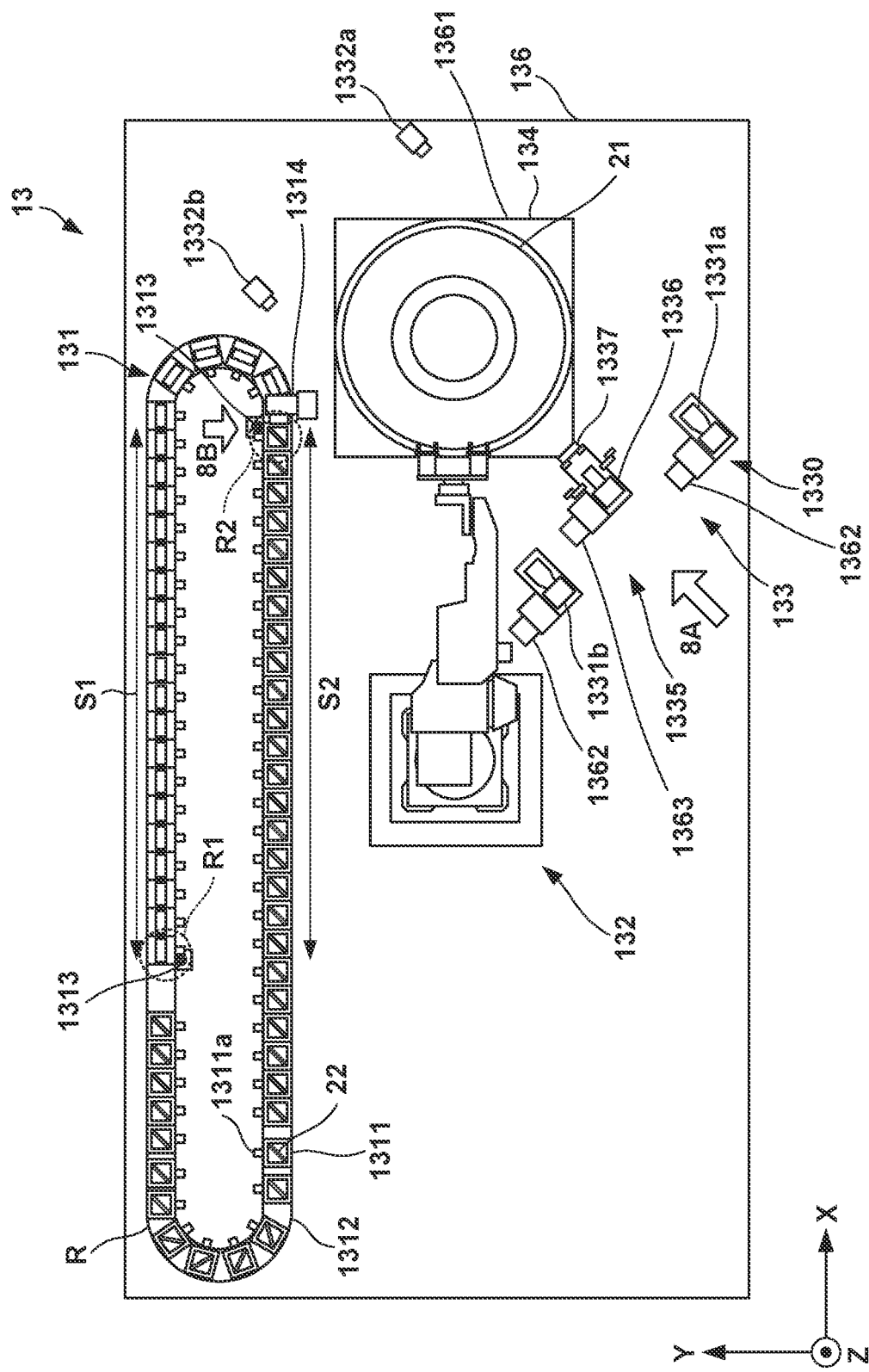
FIG. 8 is a plan view showing the outline of an attachment device shown in FIG. 1.

FIG. 8 is a plan view showing the outline of the attachment device 13. The attachment device 13 is a device configured to attach the blade 22 measured by the measurement device 12 to the rotating main body portion 21. The attachment device 13 is provided next to the standby region 103 of the stand 10. Hence, the transfer device 11 can efficiently transfer the blade 22 measured by the measurement device 12 to the attachment device 13. The attachment device 13 includes a placement portion 131, a robot 132, a rotating body measurement portion 133, a rotating body support portion 134, and a control portion 135 (to be described later). The attachment device 13 also includes a base portion 136 that integrates the placement portion 131, the robot 132, the rotating body measurement portion 133, and the rotating body support portion 134.

The placement portion 131 is configured to place the blade 22 to be attached to the rotating main body portion 21. In this embodiment, the placement portion 131 is arranged on the side of the stand 10. This can shorten the moving distance of the transfer device 11 when transferring the blade 22 between the standby region 103 and the placement portion 131 and enables efficient transfer of the blade 22.

In this embodiment, the placement portion 131 includes a plurality of conveyance bodies 1311, a moving unit 1312, a regulation unit 1313, and a reading unit 1314. The reading unit 1314 has a configuration similar to, for example, the reading device 1241 of the measurement device 12, and reads the identifier 224 added to the blade 22 in advance. The reading device 1241 is, for example, a barcode reader.

The plurality of conveyance bodies 1311 each include a blade placement portion 1311b on which the blade 22 is placed, and a projecting portion 1311a on which the movement of the conveyance body 1311 is regulated by the regulation unit 1313. Note that as for the blade support members 1232, the reference numeral is added to only some of these and omitted for the remaining in consideration of the visibility.

The moving unit 1312 includes an endless path portion Ron which the plurality of conveyance bodies 1311 circulatively move. That is, the plurality of conveyance bodies 1311 are mounted on the endless path portion R. For example, the moving unit 1312 may be a roller conveyor that forms the endless path portion R, and another conveyor or a known conveyance mechanism can be employed.

Also, in this embodiment, a placement section S1 including a placement position R1 and an attachment section S2 including an extraction position R2 are provided on the path portion R of the moving unit 1312. The placement section S1 is a section where the transfer device 11 can transfer the blade 22 between the stand 10 and the conveyance body 1311. The attachment section S2 is a section where the blade 22 to be attached to the rotating main body portion 21 can be transferred by the robot 132 between the rotating main body portion 21 and the conveyance body 1311. For example, if the reading unit 1314 reads the identifier 224 of the blade 22 at the attachment position R2, and the read identifier 224 matches the identifier 224 of the blade 22 to be attached, the robot 132 may grip the blade 22. Note that the placement section S1 and the attachment section S2 can appropriately be designed in accordance with the configurations and the like of the transfer device 11 and the robot 132.

The regulation unit 1313 is a unit configured to regulate the movement of the conveyance body 1311 by the moving unit 1312. The regulation unit 1313 regulates the movement of the conveyance body 1311 when, for example, the transfer device 11 places the blade 22 on the empty conveyance body 1311, or when the robot 132 grips, from the conveyance body 1311, the blade 22 to be attached to the rotating main body portion 21. The movement of the conveyance body 1311 is also regulated when the reading unit 1314 reads the identifier 224 of the blade 22.

Figure 9A:
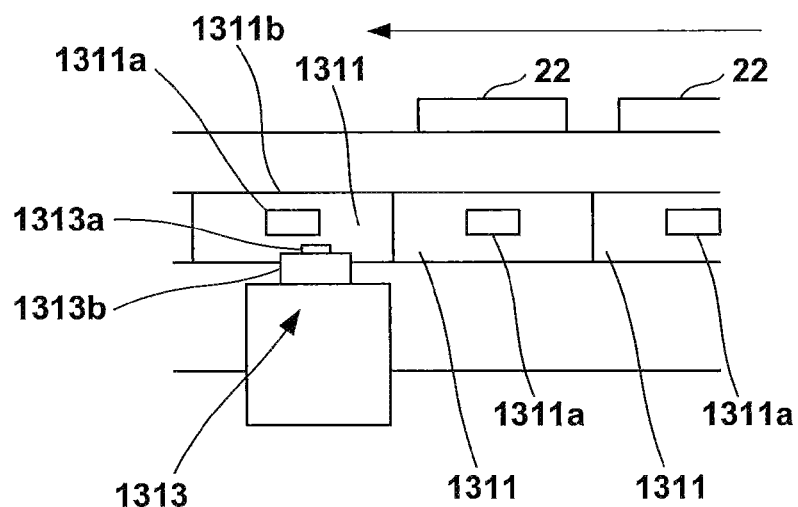
FIG. 9A is a view taken in the direction of an arrow 8B in FIG. 8 and showing a state in which a regulation unit does not regulate the movement of a conveyance body.
Figure 9B:
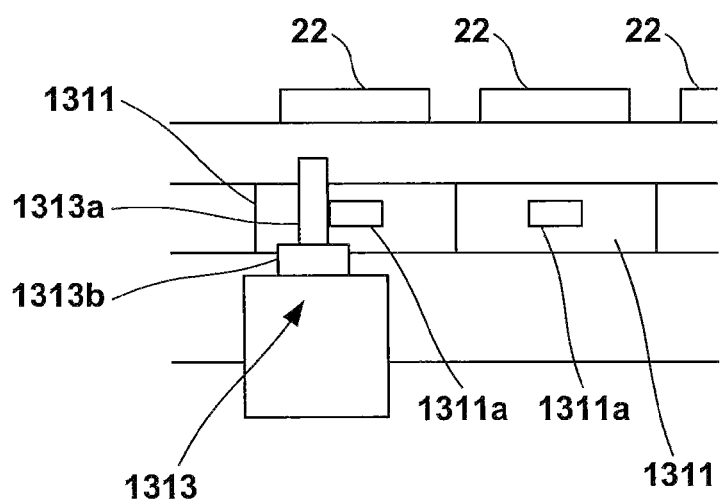
FIG. 9B is a view taken in the direction of the arrow 8B in FIG. 8 and showing a state in which the regulation unit regulates the movement of the conveyance body.

FIG. 9A is a view taken in the direction of an arrow 8B in FIG. 8 and showing a state in which the regulation unit 1313 does not regulate the movement of the conveyance body 1311 (a state in which the regulation unit 1313 does not abut against the conveyance body 1311). FIG. 9B is a view taken in the direction of the arrow 8B in FIG. 8 and showing a state in which the regulation unit 1313 regulates the movement of the conveyance body 1311 (a state in which the regulation unit 1313 abuts against the conveyance body 1311). A base portion 1313b of the regulation unit 1313 supports the regulation member 1313a such that it can displace in the up-and-down direction. When the conveyance body 1311 is movable (FIG. 9A), the regulation member 1313a displaces upward and is located on the moving path of the projecting portion 1311a, and the projecting portion 1311a of the conveyance body 1311 abuts against the regulation member 1313a, thereby regulating the movement of the conveyance body 1311 (FIG. 9B). Note that the configuration of the regulation unit 1313 is merely an example, and another configuration can be employed. For example, the regulation member 1313a may be provided to be displaceable in a direction perpendicular to the moving direction of the moving unit 1311.

Note that in this embodiment, a configuration in which the moving unit 1312 is included in the placement portion 131 has been described as an example. However, a configuration in which the placement portion 131 does not include the moving unit 1311 can also be employed. For example, the conveyance body may be a self-propelled conveyance body in which a driving mechanism for movement is formed.

Figure 11:
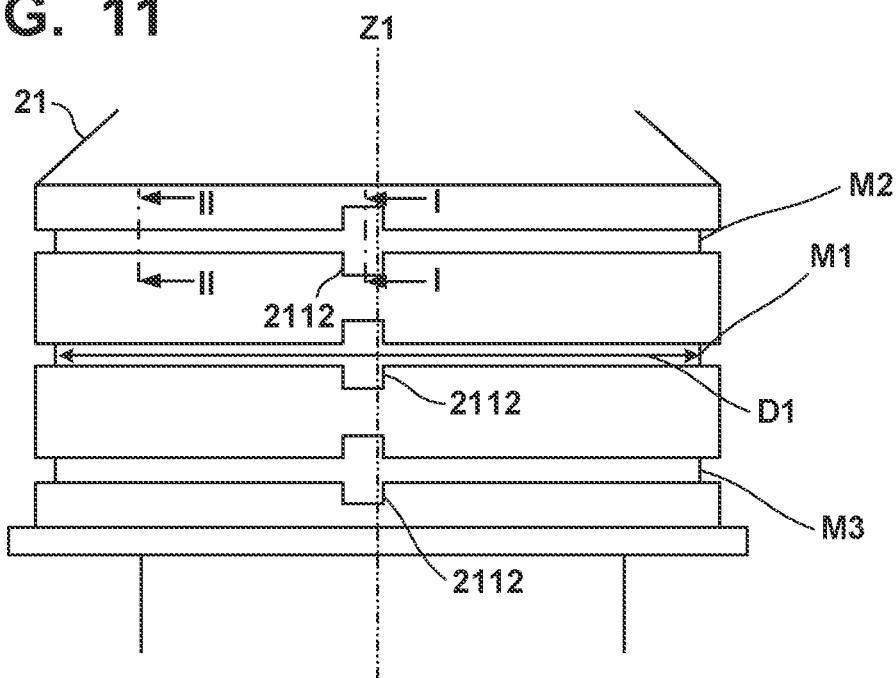
FIG. 11 is a view taken in the direction of the arrow 8A and showing only a rotating main body portion 21.

FIGS. 10 and 11 will be referred to together. FIG. 10 is a view taken in the direction of an arrow 8A in FIG. 8, and FIG. 11 is a view taken in the direction of the arrow 8A and showing only the rotating main body portion 21. In this embodiment, the rotating main body portion 21 is supported by the rotatable rotating body support portion 134, and the rotating body measurement portion 133 is provided to be able to measure the physical amounts of the rotating main body portion 21.

The rotating main body portion 21 will be described here. The rotating main body portion 21 forms the main body portion of the rotating assembly 2 (see FIG. 13B) and rotates about a rotation axis Z1. In this embodiment, the rotating main body portion 21 includes a circumferential surface, and the circumferential surface is provided with attachment portions M1 to M3 to which the blade 22 can be attached. In this embodiment, the attachment portions M1 to M3 are grooves continuously formed on the circumference set with respect to the rotation axis Z1 as the center. Note that the description will be made below taking the attachment portion M1 as an example. The rotating body measurement portion 133 can perform the same measurement for the attachment portions M2 and M3 as well. The attachment portions M1 to M3 may simply be referred to as attachment portions M if these are not particularly discriminated. Note that in this embodiment, the description will be made using, as an example, a case in which the rotating assembly 2 is an integrated structure including the attachment portions M1 to M3. However, the rotating assembly 2 is not limited to this. For example, the rotating assembly may be formed by combining disc bodies each having, at the center, a hole for receiving a rotation axis body. More specifically, the attachment portions M2, M1, and M3 including insertion ports 2112 (to be described later) may be formed in the outer peripheral portions of three disc bodies, and a rotation axis body may be fitted in the holes of the three disc bodies to form the rotating main body portion 22.

The rotating body measurement portion 133 performs movement concerning the rotating main body portion 21. In this embodiment, the rotating body measurement portion 133 includes a perimeter measurement portion 1330 and a gap measurement portion 1335.

The perimeter measurement portion 1330 measures a physical amount concerning the perimeter of the attachment portion M1 of the rotating main body portion 21. In this embodiment, the attachment portion M1 is a groove formed in the circumferential direction of the rotating main body portion 21, and the perimeter measurement portion 1330 measures a diameter D1 of the groove. The perimeter of the attachment portion M1 is calculated based on the measurement result. The perimeter measurement portion 1330 includes camera units 1331a and 1331b, and illuminations 1332a and 1332b. Each of the camera units 1331a and 1331b includes a moving mechanism configured to move the camera in the axial direction (height direction) parallel to the rotation axis Z1. Each camera can be moved by the moving mechanism to a position optimum for image capturing (measurement) of the attachment portion M and can perform image capturing (measurement). Also, when each camera is moved in the axial direction, the camera can be moved to a position optimum for image capturing (measurement) of the attachment portion M2 and the attachment portion M3, which have different heights in the axial direction, and the diameter of each groove can be measured. Note that the height in the axial direction can be calculated and acquired by, for example, setting the reference of the moving mechanism based on the placement surface of the rotating body support portion 134 on which the rotating main body portion 21 is placed.

The camera units 1331a and 1331b can capture two end portions of the attachment portion M1 of the rotating main body portion 21 viewed from a side, as shown in FIG. 10. In other words, the camera unit 1331a captures one side portion of the attachment portion M1 viewed from a side and acquires information concerning the position. The camera unit 1331b captures the other side portion located at a position symmetric to the one side portion with respect to the rotation axis Z1 of the rotating main body portion 21 on the circumference of the groove of the attachment portion M1 and acquires information concerning the position. The distance of the diameter D1 is calculated based on the acquired positions of the one side portion and the other side portion.

The illuminations 1332a and 1332b are provided facing the camera units 1331a and 1331b, respectively, and illuminate the image capturing ranges of the camera units 1331a and 1331b from opposite sides, respectively. Each of the illuminations 1332a and 1332b may be, for example, an LED illumination. When light sources are irradiated by the illuminations 1332a and 1332b from the directions opposite to the camera units 1331a and 1331b, the ridgeline of the rotating main body portion 21 supported by the rotating body support portion 134 arranged between these can be made clear.

Figure 12:
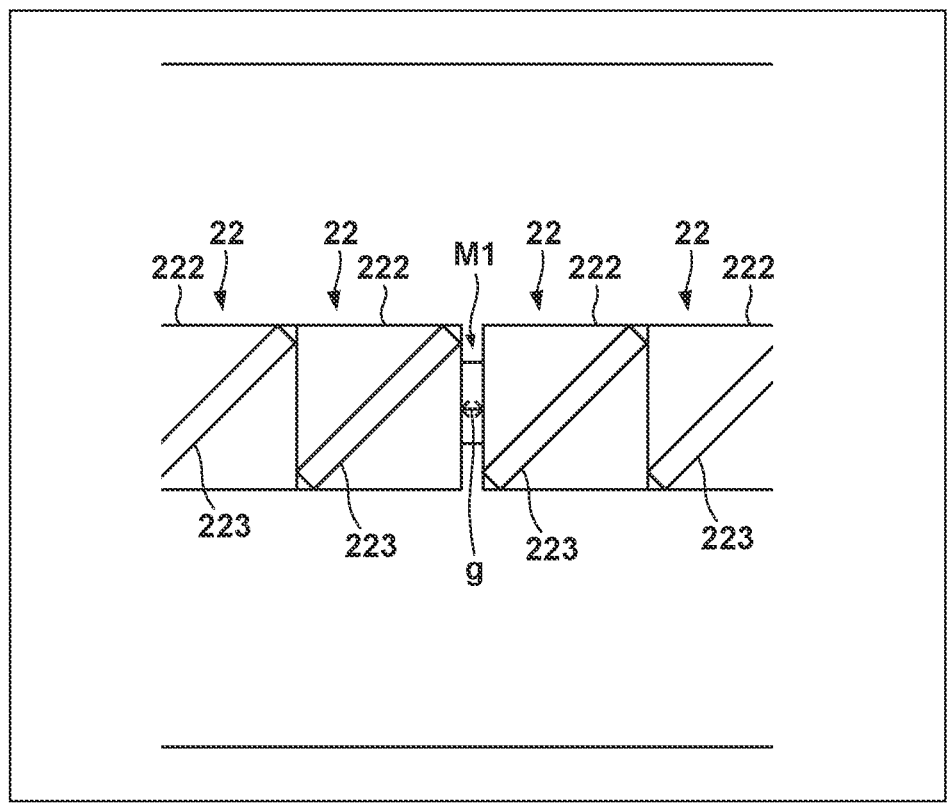
FIG. 12 is a view schematically showing an attachment portion in a state in which the blades are attached.

FIG. 12 will be referred to together. FIG. 12 is a view schematically showing the attachment portion M1 in a state in which the blades 22 are attached. The gap measurement portion 1335 performs measurement concerning the arrangement of the blades 22 attached to the attachment portion M1. For example, the gap measurement portion 1335 measures a physical amount concerning the gap between the attached target members. In this embodiment, after attachment of an arbitrary number of blades 22 along the attachment portion M1 is completed, the gap measurement portion 1335 measures a gap amount g between the blade 22 (the second blade 22 from the top in FIG. 12) attached first and the blade 22 (the third blade 22 from the top in FIG. 12) attached at last.

The gap measurement portion 1335 includes a camera unit 1336 and an illumination 1337. The camera unit 1336 includes a moving mechanism configured to move the camera in the axial direction parallel to the rotation axis Z1. The camera unit 1336 captures (measures) the gap amount g, and the captured image is analyzed, thereby calculating the gap amount g. The illumination 1337 illuminates the image capturing region of the camera unit 1336. For example, the illumination 1337 may be an LED illumination. Also, the camera unit 1336 includes a moving mechanism configured to move the camera in the axial direction parallel to the rotation axis Z1. The camera can be moved by the moving mechanism to an image capturing position optimum for the measurement of the physical amount concerning the gap between the attached target members and can perform image capturing. Also, when the camera is moved in the axial direction, the gap amount g can be captured and measured at a position optimum for the measurement of the physical amount concerning the gap between the attached target members of the blades 22 attached to the attachment portion M2 and the attachment portion M3, which have different heights in the axial direction. Note that the height in the axial direction can be calculated and acquired by, for example, setting the reference of the moving mechanism based on the placement surface of the rotating body support portion 134 on which the rotating main body portion 21 is placed.

Note that in this embodiment, the configurations of the perimeter measurement portion 1330 and the gap measurement portion 1335 are merely examples, and the perimeter or gap may be measured using, for example, a laser length measuring sensor. Another known measurement method can also be employed.

The robot 132 attaches the blade 22 to the rotating main body portion 21. In this embodiment, the robot 132 is a vertical articulated robot having a configuration similar to the robot 122 of the measurement device 12 but may be another known industrial robot.

Attachment of the blade 22 by the robot 132 will be described here. FIGS. 13A and 13B will be referred to together with FIG. 11. FIG. 13A is a sectional view taken along a line I-I in FIG. 11, which is a schematic view showing a state halfway through inserting the blade 22 into the insertion port 2112 of the attachment portion M. FIG. 13B is a sectional view taken along a line II-II in FIG. 11, which is a view showing a state in which the blade 22 is inserted into and engages with the attachment portion M (attachment completion state). In this embodiment, the robot 132 inserts the blade 22 from the insertion port 2112 of the attachment portion M (FIG. 13A) and slides it in the circumferential direction, thereby moving the blade 22 at the position of the insertion port 2112 to a position shifted in the circumferential direction (FIG. 13B). The robot 132 sequentially repeats this operation, thereby completing attachment of all blades 22 to the attachment portion M. At this time, if the blades 22 are arranged close to each other, the final blade 22 is adjacent to the first blade 22 when the final blade 22 is attached. The perimeter of the attachment portion M of the rotating main body portion 22 is set such that a certain gap is formed between the blades 22. The gap measurement portion 1335 measures the certain gap amount g.

The base portion 136 supports the constituent elements of the attachment device 13. The base portion 136 includes a support arrangement portion 1361 in which the rotating body support portion 134 is arranged, a perimeter measurement arrangement portion 1362 in which the perimeter measurement portion 1330 is arranged and supported, and a gap measurement arrangement portion 1363 in which the gap measurement portion 1335 is arranged and supported. Since these are integrally provided in arbitrary heights on the base portion 136, the relative positions of these are defined, and measurement can correctly be performed by the perimeter measurement portion 1330 and the gap measurement portion 1335. It is also possible to efficiently move the blade 22 by the robot 132 between the conveyance body 1311 and the rotating main body portion 21.

<Control Configuration>

Figure 14:
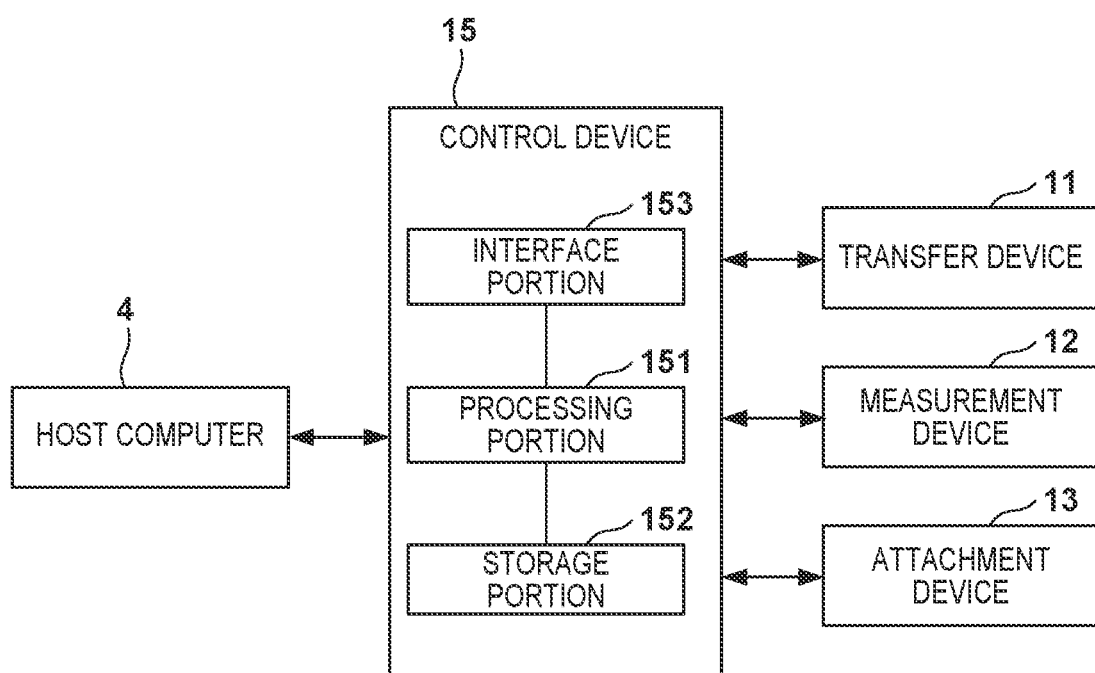
FIG. 14 is a schematic view showing the hardware configuration of the manufacturing system.

FIG. 14 is a schematic view showing the hardware configuration of the entire manufacturing system 1. In this embodiment, the control device 15, the transfer device 11, the measurement device 12, and the attachment device 13 are connected to control the operation of the entire manufacturing system 1. The control device 15 includes a processing portion 151, a storage portion 152, and an interface portion 153, and these are connected to each other by a bus 154.

The processing portion 151 is a processor represented by, for example, a CPU, and executes programs stored in the storage portion 152. The storage portion 152 includes, for example, a RAM, a ROM, a hard disk, and the like, and stores various kinds of data in addition to the programs to be executed by the processing portion 152. The interface portion 153 is provided between the processing portion 151 and an external device and is, for example, a communication interface or an I/O interface. A host computer 4 is a control device configured to manage and control an entire production facility provided with the manufacturing system 1.

Figure 15:
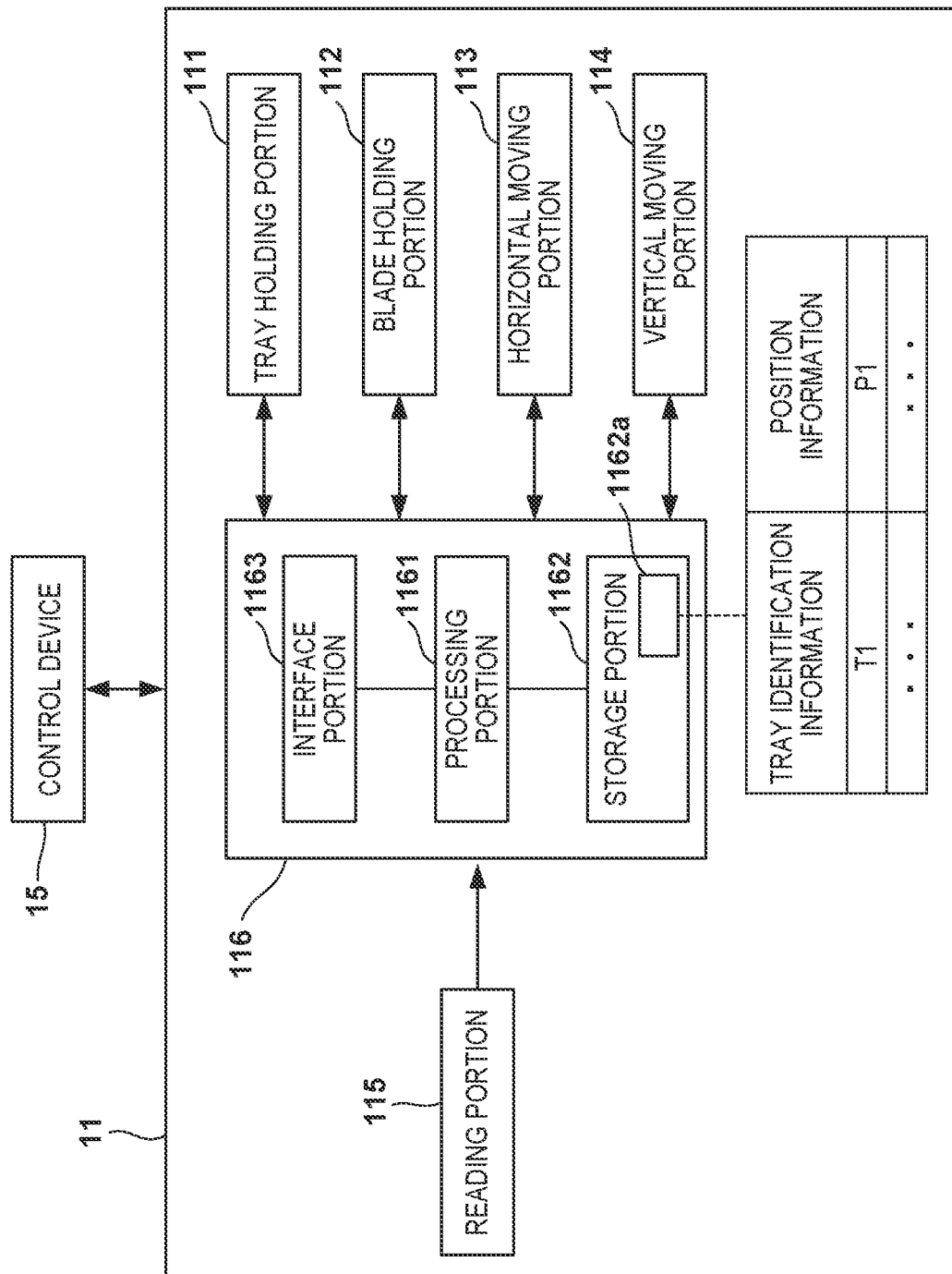
FIG. 15 is a schematic view showing the hardware configuration of the transfer device.

FIG. 15 is a schematic view showing the hardware configuration of the transfer device 11. In this embodiment, a control portion 116 and other elements that form the transfer device 11 are connected to control the operation of the transfer device 11. The control portion 116 includes a processing portion 1161, a storage portion 1162, and an interface portion 1163, and these are connected to each other by a bus 1164.

The processing portion 1161 is a processor represented by, for example, a CPU, and executes programs stored in the storage portion 1162. The storage portion 1162 includes, for example, a RAM, a ROM, a hard disk, and the like, and stores various kinds of data in addition to the programs to be executed by the processing portion 1161. The interface portion 1163 is provided between the processing portion 1161 and an external device (for example, the control device 15 or the like) and is, for example, a communication interface or an I/O interface.

The processing portion 1161 can communicate with the control device 15 via the interface portion 1163, and operates the elements of the transfer device 11 in accordance with instructions from the control device 15. For example, if an instruction for transferring the tray 3 in the supply region 103 to the placement portion 121 of the measurement device 12 is received, the processing portion 1161 operates the horizontal moving portion 113 and the vertical moving portion 114, moves the tray holding portion 111 and causes it to hold the tray 3, and transfers the tray 3 to the placement portion 121.

In this embodiment, the storage portion 1162 includes a tray position information storage portion 1162a as a storage area capable of storing data. The tray position information storage portion 1162a is a storage area configured to manage a position to place the tray 3, and includes "tray identification information" and "position information" as stored information.

The "tray identification information" is information used to identify each tray 3. For example, when the reading portion 115 of the transfer device 11 or the like reads the identifier 33 of the tray 3, the processing portion 1161 acquires the "tray identification information". In addition, the "position information" is information representing where the tray 3 is placed on the manufacturing system 1. For example, unique position information is assigned to each of the placement positions of the standby region 103 of the stand 10, the supply region 102, the collection portion 104, the placement portion 121 of the measurement device 12, and the like. If the tray 3 is placed at any placement position, the processing portion 1161 stores, in the tray position information storage portion 1162a, the "tray identification information" and the "position information" of the place where the tray 3 is placed in association with each other. This allows the tray position information storage portion 1162a to manage the position of each tray 3.

Figure 16:
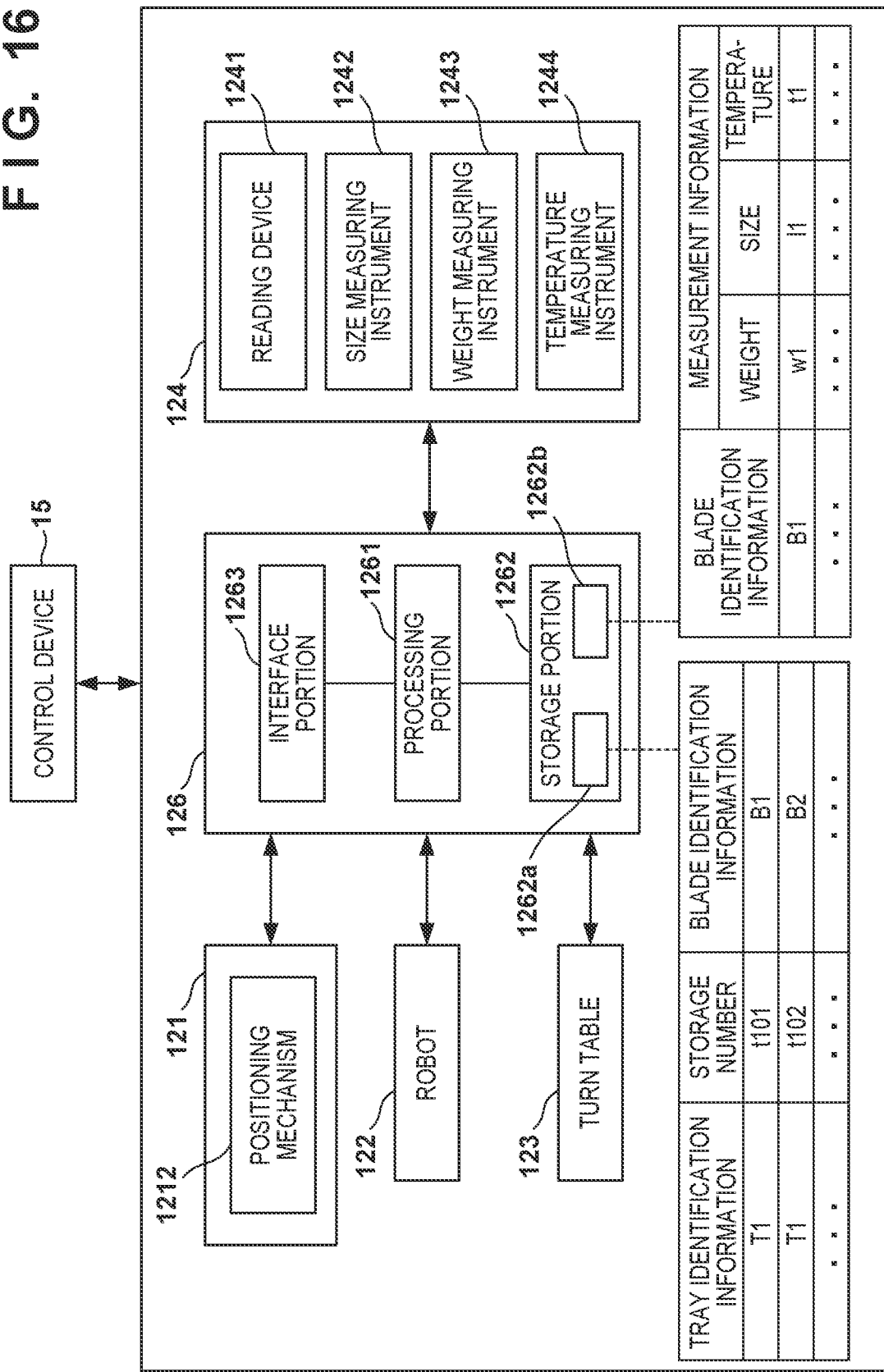
FIG. 16 is a schematic view showing the hardware configuration of the measurement device.

FIG. 16 is a schematic view showing the hardware configuration of the measurement device 12. In this embodiment, a control portion 126 and the elements of the measurement device 12 are connected to control the operation of the measurement device 12. The control portion 126 includes a processing portion 1261, a storage portion 1262, and an interface portion 1263, and these are connected to each other by a bus 1264.

The processing portion 1261 is a processor represented by, for example, a CPU, and executes programs stored in the storage portion 1262. The storage portion 1262 includes, for example, a RAM, a ROM, a hard disk, and the like, and stores various kinds of data in addition to the programs to be executed by the processing portion 1261. The interface portion 1263 is provided between the processing portion 1261 and an external device (for example, the control device 15 or the like) and is, for example, a communication interface or an I/O interface.

The processing portion 1261 can communicate with the control device 15 via the interface portion 1263, and operates the elements of the measurement device 12 in accordance with instructions from the control device 15. If an instruction for measuring a physical amount of the blade 22 placed on the placement portion 121 is received from the control device 15, the processing portion 1261 causes the robot 122 to sequentially transfer the blade 22 from the tray 3 placed on the placement portion 121 to the turn table 123. Also, the processing portion 1261 moves the blade 22 to a measurement position of the measurement unit 124 while intermittently rotating the turn table 123, and stops the turn table 123. The processing portion 1261 then causes the measurement unit 124 to measure the blade 22 moved to the measurement position. In addition, when the tray 3 is transferred to the placement portion 121 by the transfer device 11, the processing portion 1261 operates the positioning mechanism 1212 to position the tray 3.

The storage portion 1262 includes a tray storage information storage portion 1262a and a blade information storage portion 1262b as storage areas capable of storing data.

The tray storage information storage portion 1262a is a storage area configured to manage the information of the blade 22 stored in the tray 3, and includes "tray identification information" (described above), "storage number", and "blade identification information" as stored information.

The "storage number" is a number added to each of the plurality of blade storage portions 31 in the tray 3, and is information used to identify which blade storage portion 31 in the tray 3 stores a given blade 22. The "blade identification information" is information used to identify each blade 22. For example, the processing portion 1261 acquires the "blade identification information" by causing the reading device 1241 to read the identifier 224 of the blade 22. The processing portion 1261 stores the "storage number" and the "blade identification information" in the tray storage information storage portion 1262a in association with each other, thereby managing the blade 22 stored in the tray 3.

The blade information storage portion 1262b is a storage area configured to manage the measurement information of each blade, and includes "blade identification information" (described above) and "measurement information" as stored information.

The "measurement information" is information concerning the physical amounts of the blade 22 measured by the measurement device 12. In this embodiment, the "measurement information" includes the weight, the size, and the temperature of each blade 22. The processing portion 1261 stores these in the blade information storage portion 1262b in association with the "blade identification information", thereby managing the physical amounts of each blade 22.

Figure 17:
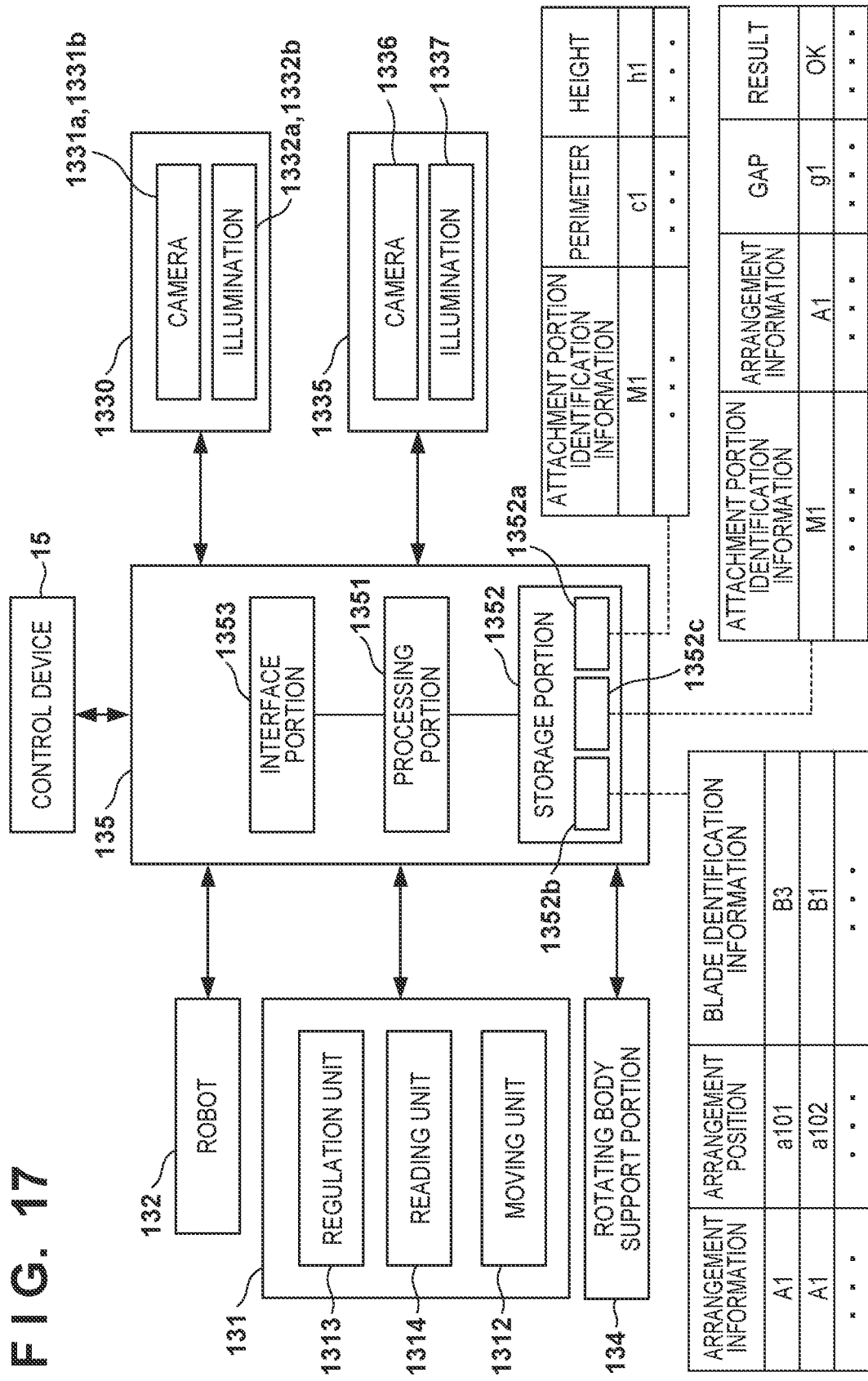
FIG. 17 is a schematic view showing the hardware configuration of the attachment device.

FIG. 17 is a schematic view showing the hardware configuration of the attachment device 13. In this embodiment, a control portion 135 and the elements of the attachment device 13 are connected to control the operation of the attachment device 13. The control portion 135 includes a processing portion 1351, a storage portion 1352, and an interface portion 1353, and these are connected to each other by a bus 1354.

The processing portion 1351 is a processor represented by, for example, a CPU, and executes programs stored in the storage portion 1352. The storage portion 1352 includes, for example, a RAM, a ROM, a hard disk, and the like, and stores various kinds of data in addition to the programs to be executed by the processing portion 1351. The interface portion 1353 is provided between the processing portion 1351 and an external device (for example, the control device 15 or the like) and is, for example, a communication interface or an I/O interface.

The processing portion 1351 can communicate with the control device 15 via the interface portion 1353, and operates the elements of the attachment device 13 in accordance with instructions from the control device 15. For example, if a request for acquiring information about the perimeter of the rotating main body portion 21 is received from the control device 15, the processing portion 1351 causes the perimeter measurement portion 1330 to measure the perimeter of the rotating main body portion 21. Also, if an attachment instruction is received from the control device 15, the processing portion 1351 causes the robot 132 to attach the blade 22 based on information stored in an arrangement information storage portion 1352b (to be described later). After attachment, the processing portion 1351 causes the gap measurement portion 1335 to measure the gap, and determines the state of the gap.

In this embodiment, the storage portion 1352 includes an attachment portion information storage portion 1352a, the arrangement information storage portion 1352b, and a gap information storage portion 1352c as storage areas capable of storing data. The attachment portion information storage portion 1352a is a storage area configured to manage the information of the attachment portion M of the rotating main body portion 21, and includes "attachment portion identification information", "perimeter", and "height" as stored information or the like.

The "attachment portion identification information" is information used to identify each attachment portion M. The "perimeter" is the perimeter of the attachment portion M measured by the perimeter measurement portion 1330 of the attachment device 13. The "height" is the height of the attachment portion M measured by the perimeter measurement portion 1330. The processing portion 1351 stores these in the attachment portion information storage portion 1352a in association with each other, thereby managing the information of each attachment portion M of the rotating main body portion 21.

The arrangement information storage portion 1352b is attachment information storage area configured to manage the arrangement of the blade 22 to be attached to the attachment portion M, and includes "arrangement information", "arrangement position", and "blade identification information" (described above) as stored information. The "arrangement position" is information concerning the position of the blade 22 in the circumferential direction of the attachment portion M. For example, the "arrangement position" may be a relative position with respect to the insertion port 2112, or may be an attachment order. The "arrangement information" is information concerning which blade 22 should be attached to each arrangement position of the attachment portion M, and is associated with the "blade identification information" and the "arrangement position". This allows the arrangement information storage portion 1352b to manage which blade 22 is attached at which position of the attachment portion M.

The gap information storage portion 1352c is a storage area configured to manage the gap between the adjacent blades 22 after the blades 22 are attached to the attachment portion M, and includes "attachment portion identification information" described above), "arrangement information", "gap", and "determination result" as stored information.

The "gap" is the gap between the adjacent blades 22 measured by the gap measurement portion 1335 of the attachment device 13. The "determination result" is a result of determining whether the gap amount g of the measured gap falls within the preset range of allowable values. When these are stored in association with the "arrangement information", information representing whether the arrangement of the blade 22 is appropriate can be accumulated.

Note that the pieces of information stored in the storage portion 1162 of the transfer device 11, the storage portion 1262 of the measurement device 12, and the storage portion 1352 of the attachment device 13 may be stored in the storage portion 152 of the control device 15. In addition, the control device 15 and the host computer 4 may communicate to store the various kinds of information in the host computer 4. In this case, the processing portion 151 of the control device 15 may request the data from each device, and the processing portion of each device may transmit the target data to the processing portion 151 based on the request from the processing portion 151 of the control device 15. Similarly, the control device 15 and the host computer 4 may communicate to transmit/receive target data.

<Operation of System>

Figure 18:
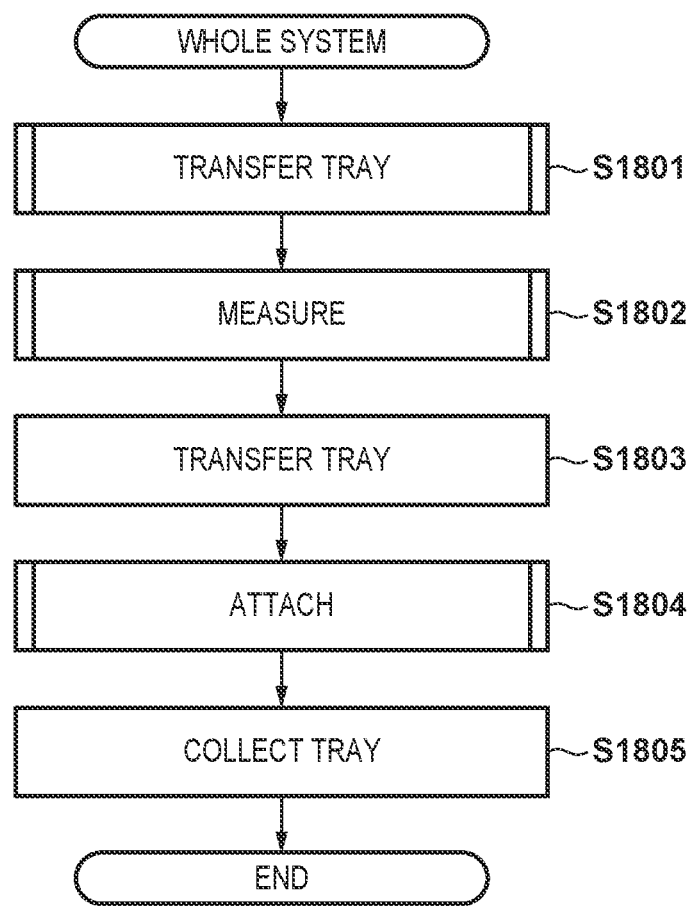
FIG. 18 is a flowchart showing an example of an attachment step of a blade by the manufacturing system.

FIG. 18 is a flowchart showing an example of an attachment step of the blade 22 by the manufacturing system 1. Each step is implemented when one or a plurality of devices of the manufacturing system 1 operate based on an instruction from the processing portion 151. For example, this flowchart starts when the tray 3 is transferred from the outside of the manufacturing system 1 to the supply region 102 of the stand 10.

In step S1801, based on an instruction from the processing portion 151, the transfer device 11 transfers the tray 3 placed in the supply region 102. At this time, the transfer device 11 transfers the tray 3 based on processing shown in FIG. 19. Upon confirming that the transfer device 11 has transferred the tray 3 to the placement portion 121, the processing portion 151 advances to the process in step S1802.

In step S1802, the measurement device 12 measures the blades 22 stored in the tray 3 based on an instruction from the processing portion 151. Details will be described with reference to FIG. 20. Upon confirming that measurement by the measurement device 12 has ended, the processing portion 151 advances to the process in step S1803.

In step S1803, based on an instruction from the processing portion 151, the transfer device 11 transfers, to the standby region 103, the tray 3 placed on the placement portion 121 in a state in which the measured blades 22 are stored. Upon confirming that the transfer device 11 has transferred the tray 3 to the standby region 103, the processing portion 151 advances to the process in step S1804.

In step S1804, the attachment device 13 attaches the blades 22 based on an instruction from the processing portion 151. Note that in this step, measurement of the perimeter of the rotating main body portion 21, selection of the blade 22 to be attached, transfer of the selected blade 22, and the like are also performed. Details of these will be described with reference to FIG. 20.

In step S1805, the transfer device 11 transfers the empty tray 3 to the collection portion 104 based on an instruction from the processing portion 151. Upon confirming that the transfer by the transfer device 11 has ended, the processing portion 151 ends the flowchart.

Note that although a series of procedures has been described above with a focus placed on a given tray 3, processing for the next tray 3 may be performed before all the processes for one tray 3 are ended. That is, the processes may be performed in parallel such that while the attachment device 13 is attaching the blade 22, the measurement device 12 performs measurement of the next blade 22. This makes it possible to efficiently perform the attachment work.

<Operation of Transfer Device>

Figure 19:
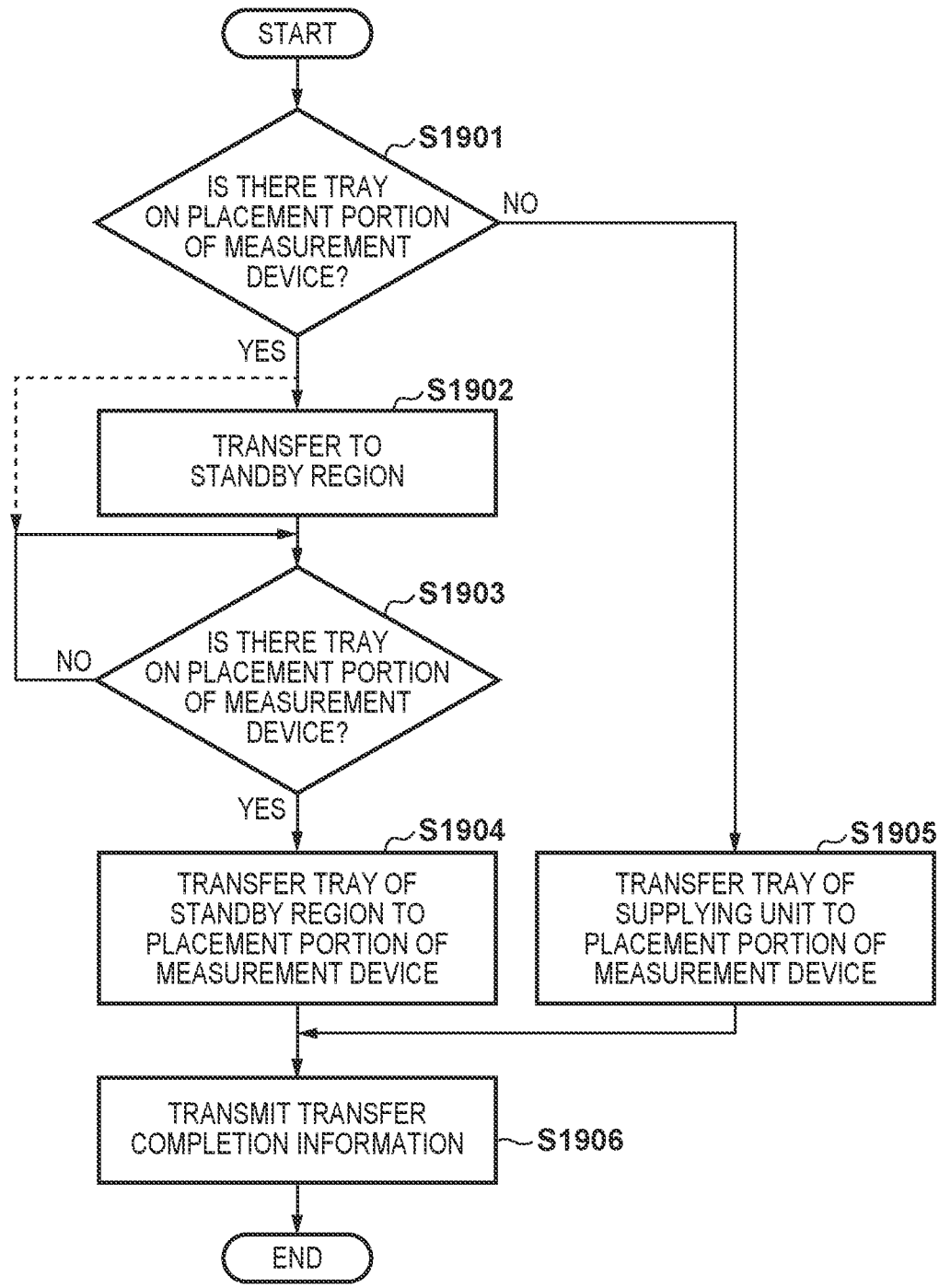
FIG. 19 is a flowchart showing details of the processing in FIG. 18, which is a flowchart showing an example of processing of the transfer device.

FIG. 19 is a flowchart showing details of the processing of step S1801, which is a flowchart showing an example of processing of the processing portion 1161 of the transfer device 11. For example, this flowchart is implemented when the processing portion 1161 of the transfer device 11 reads out and executes a program stored in the storage portion 1162. For example, this flowchart starts when the tray 3 is supplied from the outside of the manufacturing system 1 to the supply region 104, and the processing portion 1161 of the transfer device 11 receives a transfer instruction from the processing portion 151 of the control device 15.

In step S1901, the processing portion 1161 confirms whether another tray 3 is placed on the placement portion 121 as the transfer destination. If another tray is placed on the placement portion 121, the process advances to step S1902 to transfer the tray 3 to the standby region 103 and then advances to step S1903. Note that the processing of step S1902 is not executed depending on the states of the standby region 103 and the placement portion 121 (see a broken line in FIG. 19). At this time, the processing portion 1161 may cause the reading portion 115 to read the identifier 33 of the tray 3 and store, in the tray position information storage portion 1162a, the identification information of the tray 3 and the position information of the position where the tray 3 is placed. On the other hand, if any other tray 3 is not placed on the placement portion 121, the process advances to step S1905 to transfer the tray 3 to the placement portion 121 and then advances to step S1906.

In step S1903, the processing portion 1161 confirms again whether another tray 3 is placed on the placement portion 121 as the transfer destination. That is, the processing portion 1161 confirms whether the placement portion 121 is free. If any other tray is not placed on the placement portion 121, the processing portion 1161 advances to step S1904 to transfer the tray 3 to the placement portion 121 and then advances to step S1906. Note that in the processing of step S1904, if the processing of step S1902 is not omitted, the tray 3 is transferred from the standby region 103 to the placement portion 121 in step S1901. If the processing of step S1902 is performed, the tray 3 is transferred from the supply region 104 to the placement portion 121. On the other hand, if another tray 3 is placed on the placement portion 121, the processing of step S1903 is repeated.

In step S1906, the processing portion 1161 transmits, to the control device 15, information representing that the tray 3 is already transferred to the placement portion 121, and ends the flowchart. At this time, the processing portion 1161 may transmit the identification information of the tray 3 to the control device 15 together.

<Operation of Measurement Device>

Figure 20:
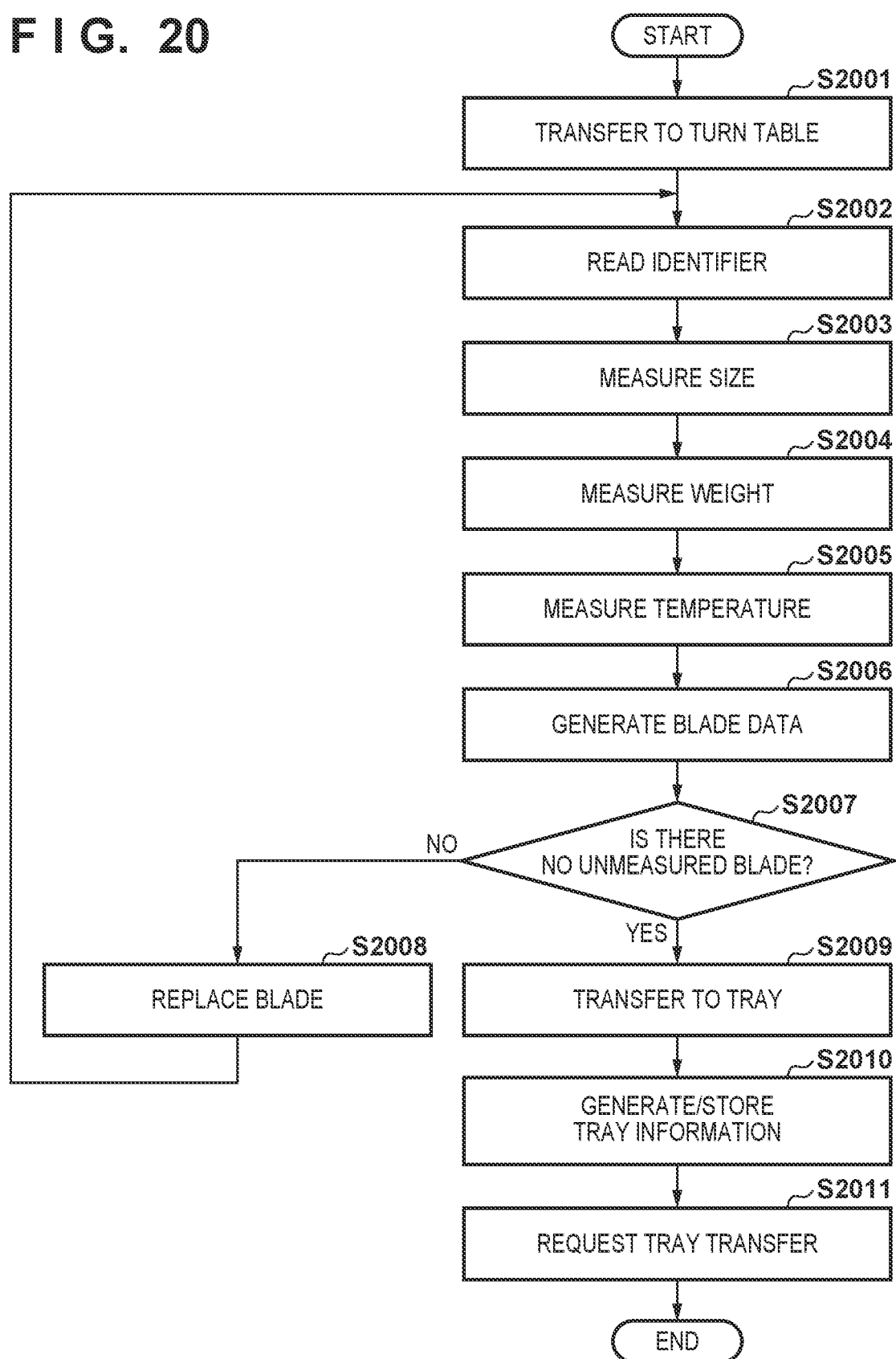
FIG. 20 is a flowchart showing details of the processing in FIG. 18, which is a flowchart showing an example of processing of the measurement device.

FIG. 20 is a flowchart showing details of the processing of step S1802, which is a flowchart showing an example of processing of the processing portion 1261 of the measurement device 12. For example, this flowchart is implemented when the processing portion 1261 of the measurement device 12 reads out and executes a program stored in the storage portion 1262. For example, this flowchart starts when the processing portion 1261 receives a measurement instruction for the processing portion 151 of the control device 15.

In step S2001, the processing portion 1261 transfers the blade 22 to the turn table 123 by the robot 122. In this embodiment, the robot 122 transfers the blade 22 to the support portion 1232 of the turn table 123.

In steps S2002 to S2005, the processing portion 1261 performs reading of the identifier 224 by the reading device 1241, size measurement by the size measuring instrument 1242, weight measurement by the weight measuring instrument 1243, and temperature measurement by the temperature measuring instrument 1244. At this time, the processing portion 1261 moves the blade 22 to the reading position and each measurement position by rotating the turn table 123 by a predetermined angle.

In step S2006, the processing portion 1261 generates blade information to be stored in the blade information storage portion 1262b based on acquired blade identification information and measurement information, and stores the blade information. More specifically, the pieces of information measured in steps S2002 to S2005 are temporarily stored in a predetermined storage portion each time, and the blade information is completed in step S2006.

In step S2007, the processing portion 1261 confirms whether an unmeasured blade 22 exists in the tray 3. If an unmeasured blade 22 exists, the processing portion 1261 advances to step S2008 to perform, by the robot 122, replacement of the measured 22 blade 22 placed on the turn table 123 with the unmeasured blade 22 stored in the tray 3, and then returns to step S2002. On the other hand, if an unmeasured blade 22 does not exist, the processing portion 1261 advances to step S2009 to transfer the blade 22 placed on the turn table 123 to the tray 3 on the placement portion 121, and then advances to step S2010.

In step S2010, the processing portion 1261 generates information to be stored in the tray storage information storage portion 1262a based on the identification information of the tray 3 and the identification information of the blade 22. After that, in step S2011, the processing portion 1261 sends a transfer request of the tray 3 to the control device 15 and ends the processing.

Note that in the above example, the operation of the measurement device 12 has been described with a focus placed on one blade 22. However, the processing may be performed parallelly for a plurality of blades 22.

<Operation of Attachment Device>

Figure 21:
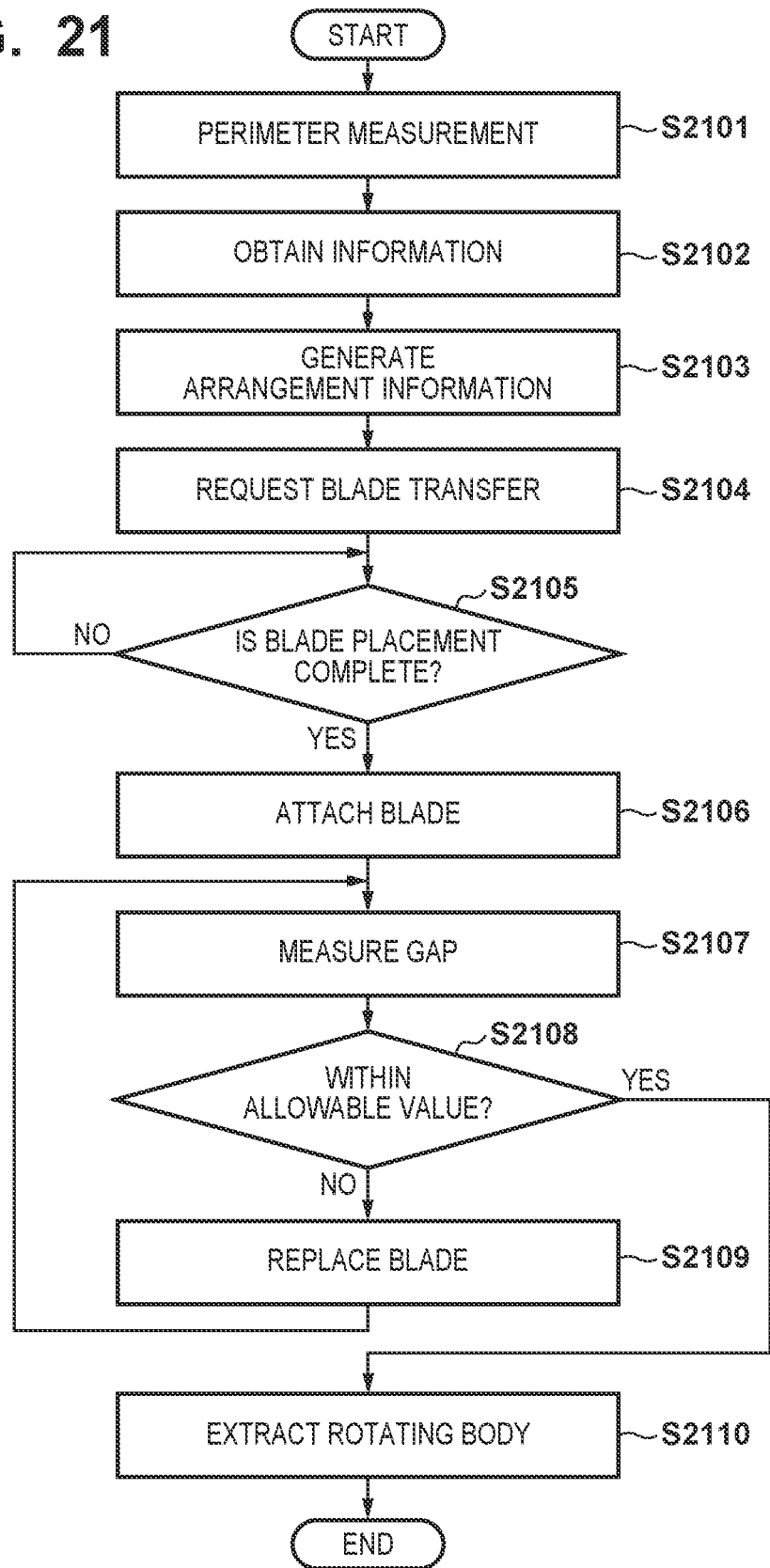
FIG. 21 is a flowchart showing details of the processing in FIG. 18, which is a flowchart showing an example of processing of the attachment device.

FIG. 21 is a flowchart showing details of the processing of step S1804, which is a flowchart showing an example of processing of the processing portion 1351 of the attachment device 12. For example, this flowchart is implemented when the processing portion 1351 of the measurement device 12 reads out and executes a program stored in the storage portion 1352. For example, this flowchart starts when the processing portion 1351 receives an attachment instruction from the processing portion 151 of the control device 15.

In step S2101, the processing portion 1351 measures the perimeter of the rotating main body portion 21 by the perimeter measurement portion 1330. After that, in step S2102, the processing portion 1351 acquires, via the control device 15, the information stored in the tray storage information storage portion 1262a and the blade information storage portion 1262b measurement device 12.

In step S2103, the processing portion 1351 generates arrangement information. Based on the perimeter of the rotating main body portion 21 and the measured size, weight, and the like of each blade 22, the processing portion 1351 decides selection and arrangement of the blade 22 to be attached. For example, the processing portion 1351 selects and arranges the blade such that there is little deviation of center of gravity after attachment, and the gap amount g of the gap after attachment of all blades 22 is equal to or less than an allowable value. Note that as for the processing of step S2103, information prepared in advance in the host computer 4 may be received, and the processing may be performed based on the received information. In step S2104, the processing portion 1351 requests the control portion 15 to transfer the selected blade 22 to the placement portion 131.

In step S2105, the processing portion 1351 confirms whether the blade 22 of the attachment target is placed on the placement portion 131. If the blade 22 of the attachment target is placed, the processing portion 1351 advances to step S2106. If the blade 22 of the attachment target is not placed, the processing of step S2105 is repeated.

Here, for example, upon receiving the transfer request in step S2104 from the processing portion 1351, the processing portion 151 of the control device 15 instructs the transfer device 11 to transfer the target blade 22 to the placement portion 131. When the transfer of the blade 22 ends, the transfer device 11 transmits transfer completion information to the processing portion 151. Upon receiving the transfer completion information, the processing portion 151 transmits information representing that the transfer operation of the blade 22 has ended to the processing portion 1351 of the attachment device 13. The processing portion 1351 receives the information, thereby confirming that the blade 22 has been placed in step S2103.

In step S2106, the processing portion 1351 attaches the blade 22 to the rotating main body portion 21 by the robot 132. The processing portion 1351 sequentially attaches the blade 22 based on the generated arrangement information, and if the attachment has ended, advances to step S2107.

In step S2107, the processing portion 1351 performs gap measurement by the gap measurement portion 1335. In this embodiment, the gap amount g of the gap between the blade 22 attached first and the blade 22 attached at last is measured. After the measurement, the processing portion 1351 advances to the processing of step S2108.

In step S2108, the processing portion 1351 confirms whether the gap amount of the gap measured in step S2107 falls within the range of allowable values. If the gap amount falls outside the range of allowable values, in step S2109, the processing portion 1351 performs replacement of the blades 22 by the robot 132 and returns to step S2107. On the other hand, if the gap amount falls within the range of allowable values, the processing portion 1351 advances to step S2110 to extract the rotating assembly 2 from the rotating body support portion 134 by a transfer unit (not shown), and ends the processing. Note that if the rotating main body portion 21 includes a plurality of attachment portions M, extraction of the rotating assembly 2 is performed after the attachment of the blades 22 to all the attachment portions M is ended.

As described above, according to the manufacturing system 1 of this embodiment, attachment of the blades 22 to the rotating main body portion 21 can automatically be performed without a worker, and the rotating assembly 2 can efficiently be manufactured. Also, according to the measurement device 12 of this embodiment, since measurement can be performed by the measurement unit 124 while placing the blades 22 on the placement portion 121 and making them stand by, the measurement of the blades 22 can efficiently be performed. Furthermore, according to the attachment device 13 of this embodiment, the appropriate blades 22 can be attached based on the perimeter of the rotating main body portion 21.

OTHER EMBODIMENTS

In the above-described embodiment, the blade 22 is transferred in the order of the stand 10, the measurement device 12, the stand 10, and the attachment device 13. However, the blade 22 may be transferred from the measurement device 12 to the attachment device 13 without interposing the stand 10. That is, the transfer device 11 may transfer the blade 22 that has undergone the measurement by the measurement device 12 directly to the attachment device 13.

Also, in the above-described embodiment, the robot 132 of the attachment device 13 inserts the blade 22 sequentially from the insertion port 2112 of the rotating main body portion 21. However, a configuration capable of attaching the blade 22 from an arbitrary position of the attachment portion M can also be employed.

Figure 22:
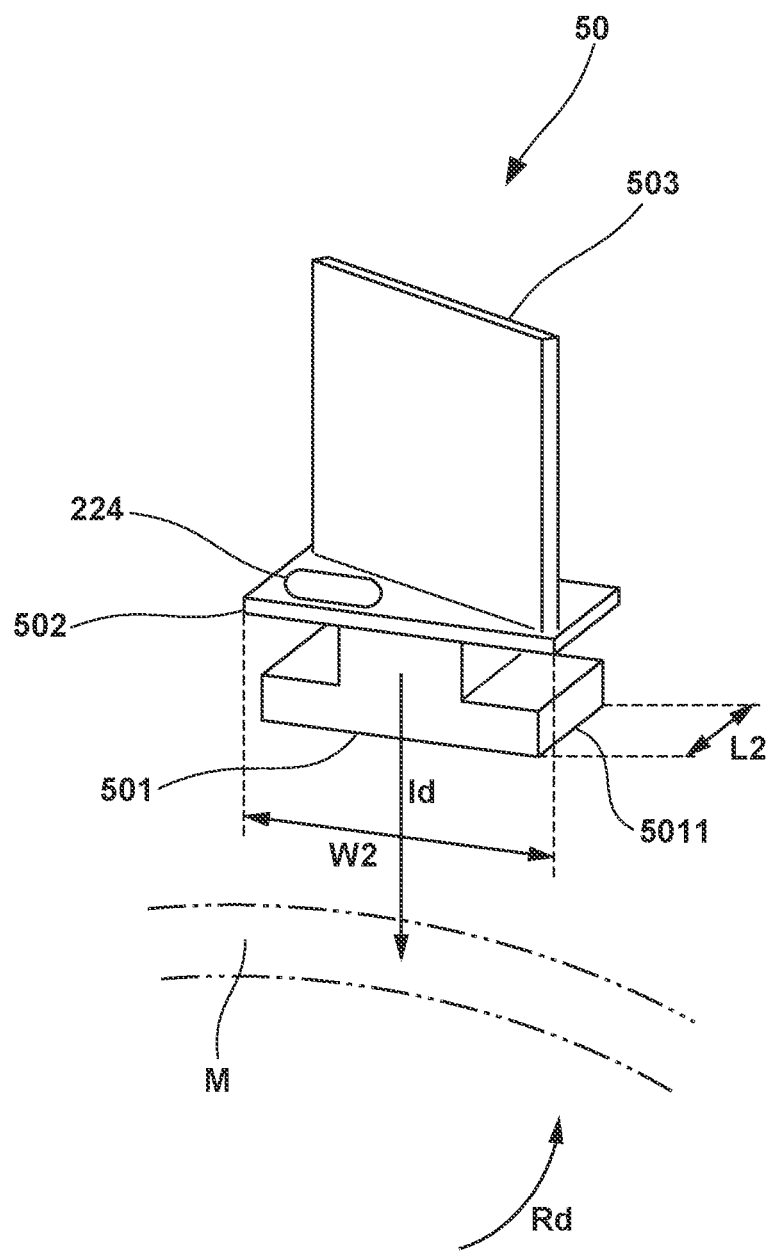
FIG. 22 is a perspective view schematically showing the configuration of a blade according to another embodiment.

FIG. 22 is a perspective view showing the outline of a blade 50 according to another embodiment. The blade 50 is configured such that a widthwise length L2 of a root portion 501 becomes shorter than the groove width of an attachment portion M. Hence, the blade 50 shown in FIG. 22 can be inserted into the groove of the attachment portion M in an insertion direction indicated by an arrow Id. After the blade 50 is inserted, the blade 50 is rotated by 90° in a rotation direction indicated by an arrow Rd, thereby attaching the blade 50 to the attachment portion M in a correct orientation. That is, an engaged portion 5011 on the lower side of the root portion 501 of the blade 50 engages with an engaging groove 2111 (see FIG. 13B) of the attachment portion M.

According to the blade 50 of this embodiment, an attachment device 13 can attach the blade 50 from an arbitrary position of the attachment portion M while rotating a rotating body support portion 124. Hence, an insertion port 2112 (see FIG. 11) need not be formed in the attachment portion M.

As described above, in the embodiments of the present invention, the system has been described as the manufacturing system 1 used to manufacture the rotating assembly 2 by attaching the blade 22 or 50 to a groove of the rotating main body portion 21. However, the present invention is not limited to this. For example, the system may be a disassembly system configured to detach and disassemble the blade 22 or 50 from the rotating assembly 2 to which the blade 22 or 50 is attached, or may be used as an overhaul system configured to replace a worn blade 22 or 50 with a new blade 22 or 50.

The invention is not limited to the foregoing embodiments, and various variations/changes are possible within the spirit of the invention.

The invention claimed is:

1. A manufacturing system configured to manufacture a rotating assembly by attaching a plurality of target members in a circumferential direction of a rotating main body portion, comprising:
   a stand on which a tray for storing the plurality of target members is placed;
   a measurement device including at least one sensor configured to measure a physical amount of each target member;
   an attachment device including an attachment robot configured to attach one target member of the plurality of target members to a predetermined position in the circumferential direction of the rotating main body portion, the attachment robot attaching the target member to the predetermined position based on the physical amount measured by the measurement device; and
   a transfer device including a transfer robot configured to transfer each target member,
   wherein
   the measurement device includes a first placement portion including a placement table on which each target member transferred from the stand by the transfer device is placed, and
   the at least one sensor includes a camera or laser sensor configured to measure a size of each target member, and a temperature sensor configured to measure a temperature of each target member.

2. The manufacturing system according to claim 1, wherein
   the transfer device transfers the tray storing the target members to the first placement portion, and
   the first placement portion comprises a first positioning member including regulation structure for regulating a position of the tray and configured to position the placed tray at a predetermined position.

3. A manufacturing system configured to manufacture a rotating assembly by attaching a plurality of target members in a circumferential direction of a rotating main body portion, comprising:
   a stand on which a tray for storing the plurality of target members is placed;
   a measurement device including at least one sensor configured to measure a physical amount of each target member;

an attachment device including an attachment robot configured to attach one target member of the plurality of target members to a predetermined position in the circumferential direction of the rotating main body portion, the attachment robot attaching the target member to the predetermined position based on the physical amount measured by the measurement device; and a transfer device including a transfer robot configured to transfer each target member, wherein the attachment device includes a second placement portion including a placement surface on which each target member is placed, and a camera configured to measure a perimeter of the rotating main body portion, and the attachment robot is configured to attach each target member placed on the second placement portion to the rotating main body portion based on the perimeter of the rotating main body portion.

4. The manufacturing system according to claim 3, wherein the second placement portion comprises:

a plurality of conveyance bodies on which the individual target members of the plurality of target members can individually be placed; and a conveyor configured to circulatively move the plurality of conveyance bodies, and a placement section including a placement position where the transfer device can place the target members on respective conveyance bodies of the plurality of conveyance bodies, and an attachment section including an extraction position where the attachment unit can extract the target members to the rotating main body portion is provided on a moving path of the plurality of conveyance bodies.

5. A manufacturing system configured to manufacture a rotating assembly by attaching a plurality of target members in a circumferential direction of a rotating main body portion, comprising:

a stand on which a tray for storing the plurality of target members is placed;

a measurement device including at least one sensor configured to measure a physical amount of each target member;

an attachment device including an attachment robot configured to attach one target member of the plurality of target members to a predetermined position in the circumferential direction of the rotating main body portion, the attachment robot attaching the target member to the predetermined position based on the physical amount measured by the measurement device; and a transfer device including a transfer robot configured to transfer each target member, wherein the stand includes:

a first placement region where the tray for storing the target members is placed;

a second placement region where the tray transferred from an outside of the manufacturing system is placed; and a third placement region where the tray to be transferred to the outside of the manufacturing system is placed, the first placement region is provided in a rectangular shape such that a plurality of trays can be arranged and placed in a predetermined first direction and a direction crossing the first direction, the measurement device is provided on a first side of the first placement region, the attachment device is provided on a second side different from the first side of the first placement region, and the second placement region and the third placement region are provided on a third side different from the first side and the second side of the first placement region.

6. The manufacturing system according to claim 5, wherein the transfer device comprises:

a first holding unit including a grip member configured to hold each target member;

horizontal moving unit including a motor as a driving source for moving the first holding unit in a horizontal direction; and vertical moving unit including a motor as a driving source for moving the first holding unit in a vertical direction.

7. The manufacturing system according to claim 6, wherein the transfer device comprises a second holding unit including a tray holder configured to hold the tray, the horizontal moving unit can further move the second holding unit in the horizontal direction, and the vertical moving unit can further move the second holding unit in the vertical direction.

8. The manufacturing system according to claim 5, wherein the stand includes a second positioning member including regulation structure for regulating a position of the tray and configured to position the placed tray.

9. The manufacturing system according to claim 5, wherein the tray includes an identifiable identifier for the tray, and the transfer device includes a reader capable of reading the identifier.

10. The manufacturing system according to claim 9 further comprising:

a memory for storing the identifier and position information of the tray with the identifier on the stand in association with each other; and a processor for discriminating the position of the tray based on the information stored in the memory.

* * * * *